US008738708B2

(12) United States Patent
Chasin

(10) Patent No.: US 8,738,708 B2
(45) Date of Patent: May 27, 2014

(54) BOUNCE MANAGEMENT IN A TRUSTED COMMUNICATION NETWORK

(75) Inventor: C. Scott Chasin, Denver, CO (US)

(73) Assignee: McAfee, Inc., Santa Clara, CA (US)

( * ) Notice: Subject to any disclaimer, the term of this patent is extended or adjusted under 35 U.S.C. 154(b) by 675 days.

(21) Appl. No.: 11/537,432

(22) Filed: Sep. 29, 2006

(65) Prior Publication Data

US 2007/0244974 A1   Oct. 18, 2007

Related U.S. Application Data

(63) Continuation-in-part of application No. 11/465,433, filed on Aug. 17, 2006, and a continuation-in-part of application No. 11/365,130, filed on Feb. 28, 2006, now Pat. No. 7,953,814, and a continuation-in-part of application No. 11/315,480, filed on Dec. 21, 2005, now Pat. No. 8,484,295, and a continuation-in-part of application No. 11/372,970, filed on Mar. 10, 2006.

(60) Provisional application No. 60/734,519, filed on Nov. 7, 2005, provisional application No. 60/657,038, filed on Feb. 28, 2005, provisional application No. 60/693,927, filed on Jun. 23, 2005, provisional application No. 60/638,208, filed on Dec. 21, 2004, provisional application No. 60/660,311, filed on Mar. 10, 2005.

(51) Int. Cl.
*G06F 15/16* (2006.01)

(52) U.S. Cl.
USPC ........................................................ 709/206

(58) Field of Classification Search
USPC ........................................................ 709/206
See application file for complete search history.

(56) References Cited

U.S. PATENT DOCUMENTS 5,627,764 A   5/1997   Schutzman et al.
5,790,790 A   8/1998   Smith et al.
(Continued)

FOREIGN PATENT DOCUMENTS

EP      1949240       7/2008
JP      2001-265674   9/2001
(Continued)

OTHER PUBLICATIONS

Corporate Factsheet 2005, Clearswift Ltd., downloaded Nov. 6, 2005 (12 pages).
(Continued)

*Primary Examiner* — Wing F Chan
*Assistant Examiner* — David X Yi
(74) *Attorney, Agent, or Firm* — Patent Capital Group

(57) ABSTRACT

An embodiment of a method handles bounced messages in a private network processing hub that is configured to handle messages submitted by a plurality of member networks that are registered with the private network processing hub, and wherein the private network processing hub and the plurality of member networks form a private network. The method may include receiving a first message from a member network or from an unregistered network within the private network processing hub, and determining whether the first message is a bounced message generated in response to an original message sent by the private network processing hub by searching the first message for a tracking identifier that was generated by the private network processing hub and inserted into the original message. The determining operation may include searching for the tracking identifier among a plurality of stored tracking identifiers. A system is described that carries out the method.

18 Claims, 15 Drawing Sheets

(56) References Cited

U.S. PATENT DOCUMENTS

| | | |
|---|---|---|
| 5,884,033 A | 3/1999 | Duvall et al. |
| 5,937,161 A | 8/1999 | Mulligan et al. |
| 5,937,162 A * | 8/1999 | Funk et al. .................... 709/206 |
| 5,987,610 A | 11/1999 | Franczek et al. |
| 6,003,027 A | 12/1999 | Prager |
| 6,052,709 A | 4/2000 | Paul |
| 6,061,448 A | 5/2000 | Smith et al. |
| 6,073,142 A | 6/2000 | Geiger et al. |
| 6,119,137 A | 9/2000 | Smith et al. |
| 6,141,686 A | 10/2000 | Jackowski et al. |
| 6,151,675 A | 11/2000 | Smith |
| 6,161,130 A | 12/2000 | Horvitz et al. |
| 6,192,360 B1 | 2/2001 | Dumais et al. |
| 6,192,407 B1 | 2/2001 | Smith et al. |
| 6,249,805 B1 | 6/2001 | Fleming, III |
| 6,266,692 B1 | 7/2001 | Greenstein |
| 6,321,267 B1 | 11/2001 | Donaldson |
| 6,381,634 B1 | 4/2002 | Tello et al. |
| 6,385,655 B1 | 5/2002 | Smith et al. |
| 6,389,455 B1 | 5/2002 | Fuisz |
| 6,393,465 B2 | 5/2002 | Leeds |
| 6,400,810 B1 | 6/2002 | Skladman et al. |
| 6,421,709 B1 | 7/2002 | McCormick et al. |
| 6,438,583 B1 | 8/2002 | McDowell et al. |
| 6,460,050 B1 | 10/2002 | Pace et al. |
| 6,470,086 B1 | 10/2002 | Smith |
| 6,487,599 B1 | 11/2002 | Smith et al. |
| 6,493,007 B1 | 12/2002 | Pang |
| 6,507,866 B1 | 1/2003 | Barchi |
| 6,529,956 B1 | 3/2003 | Smith et al. |
| 6,546,416 B1 | 4/2003 | Kirsch |
| 6,587,549 B1 | 7/2003 | Weik |
| 6,609,196 B1 | 8/2003 | Dickinson, III et al. |
| 6,615,241 B1 | 9/2003 | Miller et al. |
| 6,615,242 B1 | 9/2003 | Riemers |
| 6,618,747 B1 | 9/2003 | Flynn et al. |
| 6,643,686 B1 | 11/2003 | Hall |
| 6,643,687 B1 | 11/2003 | Dickie et al. |
| 6,643,688 B1 * | 11/2003 | Fuisz ............................ 709/206 |
| 6,650,890 B1 | 11/2003 | Irlam et al. |
| 6,651,166 B1 | 11/2003 | Smith et al. |
| 6,654,787 B1 | 11/2003 | Aronson et al. |
| 6,711,615 B2 | 3/2004 | Porras et al. |
| 6,725,381 B1 | 4/2004 | Smith et al. |
| 6,732,101 B1 | 5/2004 | Cook |
| 6,732,157 B1 | 5/2004 | Gordon et al. |
| 6,748,529 B2 | 6/2004 | Smith |
| 6,757,830 B1 | 6/2004 | Tarbotton et al. |
| 6,769,016 B2 | 7/2004 | Rothwell et al. |
| 6,772,196 B1 | 8/2004 | Kirsch et al. |
| 6,802,012 B1 | 10/2004 | Smithson et al. |
| 6,826,609 B1 | 11/2004 | Smith et al. |
| 6,829,635 B1 | 12/2004 | Townshend |
| 6,842,773 B1 | 1/2005 | Ralston et al. |
| 6,850,602 B1 | 2/2005 | Chou |
| 6,868,498 B1 | 3/2005 | Katsikas |
| 6,901,509 B1 | 5/2005 | Kocher |
| 6,907,571 B2 | 6/2005 | Slotznick |
| 6,912,285 B2 | 6/2005 | Jevans |
| 6,941,348 B2 | 9/2005 | Petry et al. |
| 6,944,616 B2 | 9/2005 | Ferguson et al. |
| 6,963,929 B1 | 11/2005 | Lee |
| 7,016,939 B1 | 3/2006 | Rothwell et al. |
| 7,020,642 B2 | 3/2006 | Ferguson et al. |
| 7,051,077 B2 | 5/2006 | Lin |
| 7,072,942 B1 | 7/2006 | Maller |
| 7,089,241 B1 | 8/2006 | Alspector et al. |
| 7,107,254 B1 | 9/2006 | Dumais et al. |
| 7,145,875 B2 | 12/2006 | Allison et al. |
| 7,178,030 B2 | 2/2007 | Scheidt et al. |
| 7,181,764 B2 | 2/2007 | Zhu et al. |
| 7,266,508 B1 | 9/2007 | Owen et al. |
| 7,320,020 B2 | 1/2008 | Chadwick et al. |
| 7,360,165 B2 | 4/2008 | Cortright et al. |
| 7,401,148 B2 | 7/2008 | Lewis |
| 7,472,422 B1 | 12/2008 | Agbabian |
| 7,506,155 B1 | 3/2009 | Stewart et al. |
| 7,680,890 B1 | 3/2010 | Lin |
| 7,870,240 B1 | 1/2011 | Horvitz et al. |
| 7,953,814 B1 | 5/2011 | Chasin et al. |
| 8,363,793 B2 | 1/2013 | Chasin et al. |
| 8,484,295 B2 | 7/2013 | Chasin et al. |
| 2002/0007453 A1 | 1/2002 | Nemovicher |
| 2002/0120697 A1 * | 8/2002 | Generous et al. ............. 709/206 |
| 2002/0188863 A1 | 12/2002 | Friedman |
| 2002/0199095 A1 | 12/2002 | Bandini et al. |
| 2003/0009698 A1 | 1/2003 | Lindeman et al. |
| 2003/0023736 A1 | 1/2003 | Abkemeier |
| 2003/0061506 A1 | 3/2003 | Cooper et al. |
| 2003/0074413 A1 | 4/2003 | Nielsen et al. |
| 2003/0101181 A1 | 5/2003 | Al-Kofahi et al. |
| 2003/0158905 A1 | 8/2003 | Petry et al. |
| 2003/0167402 A1 | 9/2003 | Stolfo et al. |
| 2003/0172294 A1 | 9/2003 | Judge |
| 2003/0177387 A1 | 9/2003 | Osterwalder et al. |
| 2003/0187937 A1 | 10/2003 | Yao et al. |
| 2003/0187942 A1 | 10/2003 | Quine et al. |
| 2003/0212546 A1 | 11/2003 | Shaw |
| 2003/0220978 A1 | 11/2003 | Rhodes |
| 2003/0236835 A1 | 12/2003 | Levi et al. |
| 2003/0236847 A1 | 12/2003 | Benowitz et al. |
| 2004/0058673 A1 | 3/2004 | Irlam et al. |
| 2004/0078334 A1 | 4/2004 | Malcolm et al. |
| 2004/0088369 A1 | 5/2004 | Yeager et al. |
| 2004/0088551 A1 | 5/2004 | Dor et al. |
| 2004/0177110 A1 | 9/2004 | Rounthwaite et al. |
| 2004/0177120 A1 * | 9/2004 | Kirsch .......................... 709/206 |
| 2004/0177271 A1 | 9/2004 | Arnold et al. |
| 2004/0199597 A1 | 10/2004 | Libbey et al. |
| 2004/0267893 A1 | 12/2004 | Lin |
| 2005/0010644 A1 | 1/2005 | Brown et al. |
| 2005/0015626 A1 | 1/2005 | Chasin |
| 2005/0021649 A1 | 1/2005 | Goodman et al. |
| 2005/0044153 A1 | 2/2005 | Gross |
| 2005/0044170 A1 | 2/2005 | Cox et al. |
| 2005/0063365 A1 | 3/2005 | Mathew et al. |
| 2005/0064850 A1 | 3/2005 | Irlam et al. |
| 2005/0076084 A1 | 4/2005 | Loughmiller et al. |
| 2005/0080816 A1 | 4/2005 | Shipp |
| 2005/0081059 A1 | 4/2005 | Bandini et al. |
| 2005/0091272 A1 | 4/2005 | Smith et al. |
| 2005/0125667 A1 * | 6/2005 | Sullivan et al. ............... 713/170 |
| 2005/0149747 A1 | 7/2005 | Wesinger et al. |
| 2005/0182959 A1 | 8/2005 | Petry et al. |
| 2005/0182960 A1 | 8/2005 | Petry et al. |
| 2005/0198159 A1 | 9/2005 | Kirsch |
| 2005/0198182 A1 | 9/2005 | Prakash et al. |
| 2005/0240617 A1 | 10/2005 | Lund et al. |
| 2005/0259667 A1 | 11/2005 | Vonokurov et al. |
| 2005/0266832 A1 | 12/2005 | Irlam et al. |
| 2006/0015726 A1 | 1/2006 | Callas |
| 2006/0031483 A1 | 2/2006 | Lund et al. |
| 2006/0039540 A1 | 2/2006 | Issinski |
| 2006/0047766 A1 | 3/2006 | Spadea |
| 2006/0075497 A1 | 4/2006 | Garg |
| 2006/0080432 A1 | 4/2006 | Spataro et al. |
| 2006/0080613 A1 | 4/2006 | Savant |
| 2006/0095524 A1 | 5/2006 | Kay et al. |
| 2006/0168006 A1 | 7/2006 | Shannon et al. |
| 2006/0168024 A1 | 7/2006 | Mehr et al. |
| 2006/0168057 A1 * | 7/2006 | Warren et al. ................. 709/206 |
| 2006/0277220 A1 | 12/2006 | Patrick et al. |
| 2006/0277597 A1 | 12/2006 | Dreymann |
| 2007/0008987 A1 | 1/2007 | Manion et al. |
| 2007/0044152 A1 | 2/2007 | Newman et al. |
| 2007/0067392 A1 | 3/2007 | Torres et al. |
| 2007/0100949 A1 | 5/2007 | Hulten et al. |
| 2007/0106698 A1 | 5/2007 | Elliott et al. |
| 2007/0107059 A1 | 5/2007 | Chasin et al. |
| 2007/0214227 A1 | 9/2007 | Quinn |
| 2008/0294726 A1 | 11/2008 | Sidman |
| 2010/0030858 A1 | 2/2010 | Chasin |
| 2011/0197257 A1 | 8/2011 | Maes |

(56) References Cited

U.S. PATENT DOCUMENTS

| | | |
|---|---|---|
| 2011/0197275 A1 | 8/2011 | Chasin et al. |
| 2013/0041955 A1 | 2/2013 | Chasin et al. |
| 2013/0117397 A1 | 5/2013 | Chasin et al. |

FOREIGN PATENT DOCUMENTS

| | | |
|---|---|---|
| JP | 2004-287790 | 10/2004 |
| JP | 2009515426 | 4/2009 |
| WO | WO 2005/006139 | 1/2005 |
| WO | WO 2005/010692 | 2/2005 |
| WO | WO 2007/055770 | 5/2007 |

OTHER PUBLICATIONS

Zachariassen, Rayan, ZMailer The Manual, v.1.99.26. 200602020935, available at http://www.zmailer.org/zman/zmanual.shtml, downloaded Apr. 28, 2006.

Sendmail, Inc., Sendmail.org home page, available at http://www.sendmail.org/, downloaded Nov. 6, 2005.

Lindberg, G., RFC 2505—Anti-Spam Recommendations for SMTP MTAs, The Internet Society, Feb. 1999, available at http://www.faqs.org/rfcs/rfc2505.html, downloaded Nov. 6, 2005.

Postfix.org web site, available at http://www.postfix.org, downloaded Nov. 6, 2005.

Mail Abuse Prevention System, LLC, Basic Mailing List Management Guidelines for Preventing Abuse, available at http://web.archive.org/web/20010309004654/maps.vix.com/manage.html, downloaded Nov. 6, 2005.

Stolfo, Salvatore J. et al., research paper, "Combining Behavior Models to Secure E-Mail Systems," Columbia University, May 16, 2003.

Bhattacharyya, Manasi, et al., research paper, "MET: An Experimental System for Malicious Email Tracking," Columbia University and Cornell University.

Gupta, A., et al., research paper, "An Approach for Detecting Self-Propogating Email Using Anamoly Detection," Department of Computer Science, Stony Brook University.

Stolfo, Salvatore J., et al., research paper, "Detecting Viral Propagations Using Email Behavior Profiles," Columbia University.

"Allegro's Mailzone Stops Back Orifice 2000," Allegro.net press release, Jul. 15, 1999, available at www.webarchive.org, downloaded Apr. 29, 2006.

"Allegro's Mailzone Stops Back Orifice 2000," Allegro.net press release, Jul. 14, 1999, available at www.webarchive.org., downloaded Apr. 29, 2006, available at www.webarchive.org., downloaded Apr. 29, 2006.

"Allegro's Mailzone Blocks Illegal MP3 Files," Allegro.net press release, Jul. 14, 1999, available at www.webarchive.org., downloaded Apr. 29, 2006.

"Allegro's Mailzone Stops 'Worm' While on the 'Net," Allegro.net press release, Jun. 10, 1999, available at www.webarchive.org., downloaded Apr. 29, 2006.

"Allegro's Richard Bliss to speak at upcoming 'E-mail Outsourcing' conference," Allegro.net press release, Jun. 2, 1999, available at www.webarchive.org, downloaded Apr. 29, 2006.

"'Phantom Menace' a real menace to network administration," Allegro.net press release, Apr. 28, 1999, available at www.webarchive.org, downloaded Apr. 29, 2006.

"Allegro Mailzone Filters Junk E-Mail," Law Technology Product News, vol. 6, Issue 3, Mar. 1999, available at www.webarchive.org, downloaded Apr. 29, 2006.

Thyfault, Mary E., "Companies choose outside e-mail services for cost, functionality, and easy administration," Information Week, Aug. 2, 1999, available at www.informationweek.com, downloaded Apr. 29, 2006.

"Allegro messaging company has protected 1,0000 businesses from viruses," Dayton Business Journal, Jun. 11, 1999, available at www.dayton.bizjournals.com, downloaded Apr. 29, 2006.

McNamara, Paul, "Take my apps—please," NetworkWorld, May 31, 1999, available at www.networkworld.com, downloaded Apr. 29, 2006.

Mailzone Web Site, available at www.webarchive.org, downloaded Apr. 29, 2006.

Listsery 14.5 @ Miami University, "Allegro Mailzone Filters Unwanted E-mail," Jan. 25, 1999, available at www.listserve.muochio.edu, downloaded Apr. 29, 2006.

Sergeant, Internet Level Spam Detection and SpamAssassin 2.50, MessageLabs.

Graham, Better Bayesian Filtering, Jan. 2003.

Final Office Action mailed May 27, 2009 in U.S. Appl. No. 10/888,370, filed Jul. 9, 2004, by C. Scott Chasin.

Non-Final Office Action mailed Sep. 22, 2008 in U.S. Appl. No. 10/888,370, filed Jul. 9, 2004, by C. Scott Chasin.

Final Office Action mailed Jan. 16, 2008 in U.S. Appl. No. 10/888,370, filed Jul. 9, 2004, by C. Scott Chasin.

Non-Final Office Action mailed Jul. 31, 2007 in U.S. Appl. No. 10/888,370, filed Jul. 9, 2004, by C. Scott Chasin.

Non-Final Office Action mailed Apr. 28, 2009 in U.S. Appl. No. 11/372,970, filed Mar. 10, 2006, by C. Scott Chasin.

Final Office Action mailed Apr. 27, 2009 in U.S. Appl. No. 11/315,480, filed Dec. 21, 2005, by C. Scott Chasin.

Non-Final Office Action mailed Sep. 17, 2008 in U.S. Appl. No. 11/315,480, filed Dec. 21, 2005, by C. Scott Chasin.

Non-Final Office Action mailed Oct. 6, 2008 in U.S. Appl. No. 11/394,890, filed Mar. 31, 2006, by Wei Lin.

International Search Report for PCT/US2006/32402, International Searching Authority, Mar. 25, 2008.

International Search Report mailed Aug. 4, 2006 (2 pages), International Preliminary Report on Patentability issued Oct. 3, 2006 (1 page), and Written Opinion of the International Searching Authority mailed Aug. 4, 2006 (3 pages) for International Application No. PCT/US04/20899.

International Search Report mailed Dec. 2, 2009 (1 page), International Preliminary Report on Patentability issued Feb. 17, 2009 (1 page), and Written Opinion of the International Searching Authority mailed Dec. 2, 2009 (5 pages), for International Application No. PCT/US04/22846.

U.S. Appl. No. 11/365,130, filed Feb. 28, 2006.
U.S. Appl. No. 11/372,970, filed Mar. 10, 2006.
U.S. Appl. No. 11/315,480, filed Dec. 21, 2005.
U.S. Appl. No. 11/394,890, filed Mar. 31, 2006.
U.S. Appl. No. 11/465,433, filed Aug. 17, 2006.
U.S. Appl. No. 60/886,898, filed Jan. 26, 2007.

"A Method to Detect Unknown Computer Virus Using Virtual Server," Takashi Miyake et al., Technical Report of Information Processing Society of Japan, 2002-CSEC-18, Jul. 19, 2002.

"Proposal of Nat/Proxy Traversing Remote Access Technology," Hideo Yoshimi et al., Technical Report of the Institute of Electronics, Information and Communication Engineers, NS2005-84, Sep. 8, 2005.

"Servey [sic] & Choice, Mail Filtering Software—Excellently High Degree of Freedom in Setting Up—Applicability to Coded Emails Starting," Manabu Takata, Nikkei Communications, No. 302, Sep. 20, 1999, pp. 121-127.

M. Sahami, S. Dumais, D. Heckerman, and E. Horvitz, "A Bayesian approach to filtering junk e-mail", In Learning for Text Categorization—Papers from the AAAI Workshop, pp. 55-62, Madison, Wisconsin, 1998 (8 pages).

Peer-to-Peer (P2P) Roadmap; Website: http://msdn2.microsoft.com/en-us/library/bb756997(printer).aspx, date retrieved Feb. 1, 2008, 4 pages.

People Near Me; Microsoft TechNet, Website: http://technet.microsoft.com/en-us/library/bb726969(printer).aspx, published Sep. 27, 2006, date retrieved Feb. 1, 2008, 6 pages.

USPTO Oct. 31, 2007 Response to Jul. 31, 2007 Nonfinal Office Action from U.S. Appl. No. 10/888,370.

USPTO Jul. 31, 2007 Nonfinal Office Action from U.S. Appl. No. 10/888,370.

USPTO Jan. 16, 2008 Final Office Action from U.S. Appl. No. 10/888,370.

(56) References Cited

OTHER PUBLICATIONS

USPTO Mar. 17, 2008 RCE Response to Jan. 16, 2008 Final Office Action from U.S. Appl. No. 10/888,370.
USPTO May 21, 2008 Supplemental Response from U.S. Appl. No. 10/888,370.
USPTO Sep. 17, 2008 Nonfinal Office Action from U.S. Appl. No. 11/315,480.
USPTO Sep. 22, 2008 Nonfinal Office Action from U.S. Appl. No. 10/888,370.
USPTO Oct. 2, 2009 Response to Apr. 28, 2009 Nonfinal Office Action from U.S. Appl. No. 11/372,970.
USPTO Oct. 6, 2009 Nonfinal Office Action from U.S. Appl. No. 11/465,433.
USPTO Nov. 2, 2009 RCE Response to Apr. 27, 2009 Final Office Action from U.S. Appl. No. 11/315,480.
USPTO Dec. 28, 2009 Appeal Brief from U.S. Appl. No. 10/888,370.
USPTO Dec. 4, 2009 Response to Aug. 4, 2009 Nonfinal Office Action from U.S. Appl. No. 11/365,130.
USPTO Jan. 26, 2009 Response to Sep. 17, 2008 Nonfinal Office Action from U.S. Appl. No. 11/315,480.
USPTO Feb. 23, 2009 Response to Sep. 22, 2008 Nonfinal Office Action from U.S. Appl. No. 10/888,370.
USPTO Mar. 12, 2009 Supplemental Response from U.S. Appl. No. 10/888,370.
USPTO Apr. 27, 2009 Final Office Action from U.S. Appl. No. 11/315,480.
USPTO Apr. 28, 2009 Nonfinal Office Action from U.S. Appl. No. 11/372,970.
USPTO May 27, 2009 Final Office Action from U.S. Appl. No. 10/888,370.
USPTO Aug. 4, 2009 Nonfinal Office Action from U.S. Appl. No. 11/365,130 (10 pages).
USPTO Aug. 4, 2009 Office Action from U.S. Appl. No. 11/365,130.
USPTO Oct. 21, 2010 Final Office Action from U.S. Appl. No. 11/372,970.
USPTO Oct. 6, 2010 Nonfinal Office Action from U.S. Appl. No. 11/365,130.
USPTO Jan. 12, 2010 Response to Oct. 6, 2009 Nonfinal Office Action from U.S. Appl. No. 11/465,433.
USPTO Jan. 21, 2010 Nonfinal Office Action from U.S. Appl. No. 11/315,480.
USPTO Dec. 1, 2010 Response to Sep. 1, 2010 Nonfinal Office Action from U.S. Appl. No. 12/185,517.
USPTO Dec. 13, 2010 RCE Response to Sep. 24, 2010 Advisory Action from U.S. Appl. No. 11/315,480.
USPTO Dec. 20, 2010 After Final Response to Oct. 21, 2010 Final Office Action from U.S. Appl. No. 11/372,970.
USPTO Dec. 20, 2010 Response to Oct. 6, 2010 Nonfinal Office Action from U.S. Appl. No. 11/365,130.
USPTO Feb. 1, 2010 Final Office Action from U.S. Appl. No. 11/372,970.
USPTO Mar. 18, 2010 Final Office Action from U.S. Appl. No. 11/365,130.
USPTO Mar. 31, 2010 Examiner's Answer from U.S. Appl. No. 10/888,370.
USPTO Apr. 1, 2010 After Final Response to Feb. 1, 2010 Final Office Action from U.S. Appl. No. 11/372,970.
USPTO Apr. 20, 2010 Response to Jan. 21, 2010 Nonfinal Office Action from U.S. Appl. No. 11/315,480.
USPTO Apr. 28, 2010 Final Office Action from U.S. Appl. No. 11/465,433.
USPTO Apr. 28, 2010 RCE Response to Apr. 9, 2010 Advisory Action from U.S. Appl. No. 11/372,970.
USPTO Apr. 9, 2010 Advisory Action from U.S. Appl. No. 11/372,970.
USPTO May 13, 2010 Nonfinal Office Action from U.S. Appl. No. 11/372,970.
USPTO May 18, 2010 RCE Response to Mar. 18, 2010 Final Office Action from U.S. Appl. No. 11/365,130.
USPTO Jul. 28, 2010 RCE Response to Apr. 28, 2010 Final Office Action from U.S. Appl. No. 11/465,433.
USPTO Jul. 9, 2010 Final Office Action from U.S. Appl. No. 11/315,480.
USPTO Aug. 10, 2010 Response to May 13, 2010 Nonfinal Office Action from U.S. Appl. No. 11/372,970.
USPTO Sep. 1, 2010 Nonfinal Office Action from U.S. Appl. No. 12/185,517.
USPTO Sep. 24, 2010 Advisory Action from U.S. Appl. No. 11/315,480.
USPTO Sep. 9, 2010 After Final Response to Jul. 9, 2010 Final Office Action from U.S. Appl. No. 11/315,480.
USPTO Jan. 21, 2011 Advisory Action from U.S. Appl. No. 11/372,970.
USPTO Jan. 27, 2011 Notice of Allowance from U.S. Appl. No. 11/365,130.
USPTO Mar. 21, 2011 Appeal Brief from U.S. Appl. No. 11/372,970.
USPTO Mar. 4, 2011 Final Office Action from U.S. Appl. No. 12/185,517.
European Patent Office Extended Search Report, Search Opinion, and Examiner's Preliminary Opinion in EPO Patent Application Serial No. 06789864.3-1244 mailed on Feb. 16, 2012.
Aug. 30, 2011 Japan Patent Office Decision of Final Refusal in Japanese Patent Application No. 2008-538876.
Notice of Allowance in U.S. Appl. No. 10/873,882 mailed on Jan. 3, 2006.
Advisory Action in U.S. Appl. No. 10/888,370 mailed on Apr. 11, 2008.
Request for Continued Examination in U.S. Appl. No. 10/888,370 filed on Apr. 16, 2008.
Notice of Appeal in U.S. Appl. No. 10/888,370 filed on Oct. 27, 2009.
Response to Non-Final Office action dated Oct. 6, 2010 in U.S. Appl. No. 11/365,130, filed Dec. 20, 2010.
Notice of Allowance in U.S. Appl. No. 11/365,130 mailed on Feb. 10, 2011.
Notice of Allowance in U.S. Appl. No. 11/365,130 mailed on Mar. 29, 2011.
Examiner's Answer to Appeal Brief in U.S. Appl. No. 11/372,970 mailed on Jun. 9, 2011.
Appellant's Reply Brief in in U.S. Appl. No. 11/372,970 filed on Aug. 9, 2011.
Response to Non-Final Office Action dated Oct. 6, 2008 in U.S. Appl. No. 11/394,890, filed Mar. 10, 2009.
Notice of Allowance in U.S. Appl. No. 11/394,890 mailed on Jun. 26, 2009.
Request for Continued Examination in U.S. Appl. No. 11/394,890 filed on Sep. 21, 2009.
Notice of Allowance in U.S. Appl. No. 11/394,890 mailed on Oct. 29, 2009.
Non-Final Office Action in U.S. Appl. No. 12/185,517 mailed on Sep. 1, 2010.
Response Final Office Action dated Mar. 4, 2011 in U.S. Appl. No. 12/185,517, filed Jun. 6, 2011.
Advisory Action in U.S. Appl. No. 12/185,517 mailed on Jun. 29, 2011.
Notice of Appeal in U.S. Appl. No. 12/185,517 filed on Jul. 5, 2011.
Appeal Brief in U.S. Appl. No. 12/185,517 filed on Oct. 5, 2011.
Examiner's Answer to Appeal Brief in U.S. Appl. No. 12/185,517 mailed on Jan. 9, 2012.
Appellant's Reply Brief in Response to Jan. 9, 2012 Examiner's Answer in U.S. Appl. No. 12/185,517 filed on Mar. 9, 2012.
Woitaszek, M.; Shaaban, M.; Czemikowski, R., "Identifying junk electronic mail in Microsoft outlook with a support vector machine," Proceedings of the 2003 Symposium on Application and the Internet, Jan. 27-31, 2003 (4 pages).
International Preliminary Report on Patentability and Written Opinion of the International Search Authority for PCT/US2006/32402, International Searching Authority, Mar. 24, 2009 (6 pages).
Apr. 18, 2011 First Japanese Office Action for Japanese Patent Application No. 2008-538876.
Aug. 30, 2011 Japan Patent Office Final Office Action for Japanese Patent Application No. 2008-538876.

(56) References Cited

OTHER PUBLICATIONS

Dec. 13, 2011 Japan Patent Office Final Refusal in Japanese Patent Application Serial No. 2008-538876.
Non-Final Office Action in U.S. Appl. No. 13/091,011 mailed on May 9, 2012.
Response to Non-Final Office Action dated May 9, 2012 in U.S. Appl. No. 13/091,011, filed May 9, 2012.
Notice of Allowance in U.S. Appl. No. 13/091,011 mailed on Aug. 17, 2012.
Corrected Notice of Allowance in U.S. Appl. No. 13/091,011 mailed on Oct. 2, 2012.
Non-Final Office Action in U.S. Appl. No. 11/315,480 mailed on Oct. 17, 2012.
U.S. Appl. No. 13/726,607, filed Dec. 25, 2012, and entitled "Stopping and Remediating Outbound Messaging Abuse," Inventors C. Scott Chasin, et al.
Response to Non-Final Office Action dated Oct. 17, 2012 in U.S. Appl. No. 11/315,480, filed Jan. 17, 2013.
Notice of Allowance in U.S. Appl. No. 11/315,480 mailed on Feb. 5, 2013.
Non-Final Office Action in U.S. Appl. No. 11/465,433 mailed on Dec. 7, 2012.
PCT International Search Report and Written Opinion in PCT International Application No. PCT/US04/20899 mailed on Aug. 4, 2006.
PCT International Preliminary Report on Patentability in PCT International Application No. PCT/US04/20899 mailed on Oct. 3, 2006.
PCT International Search Report and Written Opinion in PCT International Application No. PCT/US04/22846 mailed on Dec. 2, 2005.
PCT International Preliminary Report on Patentability in PCT International Application No. PCT/US04/22846 mailed on Feb. 17, 2009.
PCT International Search Report and Written Opinion in PCT International Application Serial No. PCT/US2006/32402 mailed on Mar. 25, 2008.
PCT International Preliminary Report on Patentability in PCT International Application Serial No. PCT/US2006/32402 mailed on Mar. 24, 2009.
European Patent Office Communication Pursuant to Article 94(3) EPC (Examination Report) in EP Application Serial No. 06789864.3 mailed on Aug. 16, 2013.
Board of Patent Appeals Decision in U.S. Appl. No. 10/888,370 mailed on Jun. 4, 2013.
Response to Non-Final Office Action dated Dec. 7, 2012 in U.S. Appl. No. 11/465,433, filed Mar. 7, 2013.
Final Office Action in U.S. Appl. No. 11/465,433 mailed on Nov. 8, 2013.

\* cited by examiner

BOUNCE MANAGEMENT IN A TRUSTED COMMUNICATION NETWORK

CROSS-REFERENCE TO RELATED APPLICATIONS

This application claims the benefit of U.S. Provisional Patent Application Ser. No. 60/734,519, filed on Nov. 7, 2005. This application is also a continuation-in-part of (and claims the benefit of priority under 35 U.S.C. §120) U.S. patent application Ser. No. 11/465,433, filed on Aug. 17, 2006. U.S. patent application Ser. No. 11/465,433 claims the benefit of priority to U.S. Provisional Patent Application Ser. No. 60/734,519, filed on Nov. 7, 2005, and is also a continuation-in-part of U.S. patent application Ser. No. 11/365,130, filed on Feb. 28, 2006, now issued as U.S. Pat. No. 7,953,814. U.S. patent application Ser. No. 11/365,130 in turn claims the benefit of priority to U.S. Provisional Patent Application Ser. No. 60/657,038, filed on Feb. 28, 2005. U.S. patent application Ser. No. 11/465,433 is further a continuation-in-part of U.S. patent application Ser. No. 11/315,480, filed on Dec. 21, 2005. U.S. patent application Ser. No. 11/315,480 claims the benefit of priority to U.S. Provisional Patent Application Ser. No. 60/638,208 filed on Dec. 21, 2004 and U.S. Provisional Application Ser. No. 60/693,927 filed on Jun. 23, 2005. This application is also a continuation-in-part (and claims the benefit of priority under 35 U.S.C. §120) of U.S. patent application Ser. No. 11/372,970, filed on Mar. 10, 2006, which application in turn claims the benefit of priority to U.S. Provisional Patent Application Ser. No. 60/660,311 filed on Mar. 10, 2005. The disclosure of U.S. Provisional Application Ser. No. 60/734,519, U.S. patent application Ser. No. 11/465,433, U.S. patent application Ser. No. 11/365,130, U.S. patent application Ser. No. 11/315,480, and U.S. patent application Ser. No. 11/372,970 are considered part of and are incorporated by reference in the disclosure of this Application.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2006 MXTN, Inc. and MX Logic, Inc.

BACKGROUND

Today organizations and individuals are bombarded by vast amounts of Internet and email "pollution". Spam, worms, phishing attacks, spyware, adware, email address spoofing, and other types of network pollutants are ever increasing. For example, in some cases spam can account for as much as 75-80% of inbound email. Tremendous amounts of time, money, and productivity are spent every year attempting to filter out and stop pollutants in inbound email, Today, firewalls, anti-virus, anti-spam, and anti-spyware software, for example, absolutely must be installed and updated frequently if an enterprise's network and computing infrastructure is to remain up-and-running. Unfortunately, the content filtering of inbound email and other Internet communication is a costly, and often ineffective approach toward protection from network pollutants.

One problem related to email pollutants is the inability to determine the authenticity or the identity of the sender of email messages. Email message "from" addresses are easily spoofed, allowing the sender to masquerade as someone else. The sender can attach harmful malware (e.g., worms, viruses, spyware) to the email message, insert hyperlinks to false web pages (e.g., phishing), or others. The recipient of a spoofed email, believing the email is sent by a trusted acquaintance, may open a malware attachment and unleash a worm or virus into the recipient's system, or enter personal information at a false web page, only to have the recipient's identity stolen by the spoofer.

Filtering inbound email involves attempting to identify email messages with potentially harmful content or attachments. Due to the increasing volume, scope and evolution of email pollutants, the current reliance on content filtering to identify these threats continues to be a costly and technological challenge. Network threats are continually bombarding enterprise networks, and continually adapting to get around the filters that are put in place. Filtering inbound network traffic is a never ending process of upgrading to new filtering mechanisms to ward off new threats. Filtering inbound email is therefore reactionary, whereby enterprises must always be reacting to new variations and evolving threats.

Filters of spam and other email content often generate false positives and filter out "good" email. Content filtering inaccuracies can often disrupt the delivery of a legitimate email message by sidelining, quarantining or halting delivery all together. Additionally, the sender of the legitimate email often has no way of knowing whether the email message reached the intended recipient, or was filtered out without delivery. A bounce message may be generated, but bounce messages are often not very descriptive of the circumstances surrounding the bounce. A bounce (also bounce message, non-delivery report, or delivery status notification), is an automated electronic message from the receiving party's inbound message system which notifies the sending party that the message could not be delivered to one or more intended recipients. In cases where email "bounces", a non-delivery report is generated; however, the reason for the non-delivery cannot be easily determined and the sending party's IT management has no systems in place for reporting the failed email messages. Additional deliverability concerns arise due in part to the fact that email messages often hop through unreliable store-and-forward gateways in route to their destination.

Another problem relates to a characteristic of public Internet application gateways, in that these gateways must receive whatever email or other data are sent to them. As such, corporate email gateways are susceptible to denial-of-service" (DoS) attacks. DoS attacks can come in different forms, such as flooding, but all DoS attacks are intended to force the victim to reset or consume its resources so that they cannot perform the intended service and/or obstruct communication between the victim and those attempting to communicate with the victim. The combination of spoofed or forged email envelopes of spam messages often produces bounce messages which are sent erroneously to the masqueraded victim. These "bounce attacks" can flood an email gateway, interrupting critical business communication.

The reflection of the technical problems arising from polluted incoming email is the damage to enterprise reputation as a result of polluted outgoing email. Polluted email with an enterprise domain name may be sent intentionally or unintentionally from the enterprise network, thereby damaging the reputation of the enterprise. A "bot" or "Trojan horse" may become resident on a computer within the enterprise and begin spewing out polluted email messages. Alternatively, a user with malicious intent inside the enterprise may send polluted email from the enterprise. Whether intentional or unintentional, pollution emanating from an enterprise network damages the reputation of the enterprise, which in turn can adversely impact community image, sales, web page hits, supplier relationships, and the like. That said, today's enterprise must contain outbound pollution originating from their networks to ensure successful deliverability of their outgoing email.

Additionally, the majority of most business communication sent over email is transported in plain text over the public Internet and sometimes through intermediate third-party gateways. There is no guarantee to either the sender or the recipient that the email will not be intercepted in transit.

It is with respect to the foregoing and other problems that embodiments of the present invention have been made.

SUMMARY

One embodiment of the present invention is a system for handling bounced messages within a private network processing hub, wherein the private network processing hub is configured to receive and process messages submitted by a plurality of independent member networks that form a private network including the private network processing hub. This embodiment of the system includes a message transfer agent configured to receive a message from a member network. The message transfer agent is further configured to create a tracking identifier indicating that the original message was routed through the private network processing hub, and insert the tracking identifier into the original message prior to sending the original message to the recipient. The system further includes a bounce management module configured to receive a second message and determine that the second message is a bounced message that was generated in response to the original message. The bounce management module is configured to determine that the second message is a bounced message by determining that the second message includes the tracking identifier.

In some embodiments of the system the message transfer agent inserts the tracking identifier into the original message by rewriting a MAIL FROM field in the message. The message transfer agent may rewrite the MAIL FROM field by replacing a domain name in the MAIL FROM field with a Variable Envelope Return Path address that includes the tracking identifier. The tracking identifier may include a hash pointer based on one or more parts of the message. The bounce management module can verify that the second message is a bounced message generated in response to the original message by auditing a database of tracking identifiers. The bounce management module may be further configured to determine an action to take responsive to receiving a bounced message, wherein the action is specified in a policy associated with the member network of the original sender. The action to be taken may be selected from a group consisting of: send the message back to the original sender, submit the message to one or more specified administrative addresses in the member network; delete the message; store the message for later retrieval.

The bounce management module may be further configured to filter the bounced message to obtain data indicative of the reason for the bounce. The bounce management module may be further configured to generate a report indicating a reason for a bounced message. Further still, the bounce management module may be configured to aggregate a plurality of reports related to all bounced messages received in a specified period.

An embodiment of a method handles bounced messages in a private network processing hub that is configured to handle messages submitted by a plurality of member networks that are registered with the private network processing hub, and wherein the private network processing hub and the plurality of member networks form a private network. The method may include receiving a first message from a member network or from an unregistered network within the private network processing hub, and determining whether the first message is a bounced message generated in response to an original message sent by the private network processing hub by searching the first message for a tracking identifier that was generated by the private network processing hub and inserted into the original message. The determining operation may include searching for the tracking identifier in a memory containing a plurality of tracking identifiers.

The method may further include receiving a second message from a registered member network, generating a tracking identifier based on one or more parts of the second message, and inserting the generated tracking identifier into the second message prior to sending the second message to a specified recipient of the message. Still further, the method may include generating a Variable Envelope Return Path (VERP) address including the generated tracking identifier. The inserting operation may include replacing a MAIL FROM address of the second message with the VERP address. The VERP address may further include an identifier of the second message's original sender and a domain name of the private network processing hub.

An embodiment of the method may further include rejecting the first message if a tracking identifier is not found in the first message. The method may still further include utilizing content of the first message to determine a reputation metric related to a source of the first message. The reputation metric may be a measure of the source's reputation for generating spam. The method may yet further include using content of the first message to derive a spam signature.

Another embodiment of the method further includes determining a disposition for the first message if a tracking identifier is found. Determining a disposition may include querying a policy that specifies a disposition for bounced messages. The disposition may be selected from a group consisting of: send the first message to the first message's original sender; send the first message to a specified administrator address a member network, delete the first message; store the first message for later analysis.

Yet another embodiment of the method further includes filtering the first message to obtain information indicative of the reason that the bounced message was generated. The method may still further include generating a report that provides a reason for the bounced message.

While multiple embodiments are disclosed still other embodiments of the present invention will become apparent to those skilled in the art from the following detailed description, which shows and describes illustrative embodiments of the invention. As will be realized, the invention is capable of modifications in various aspects all without departing from the scope of the present invention. Accordingly, the drawings and detailed description are to be regarded as illustrative in nature and not restrictive.

Figure 1:
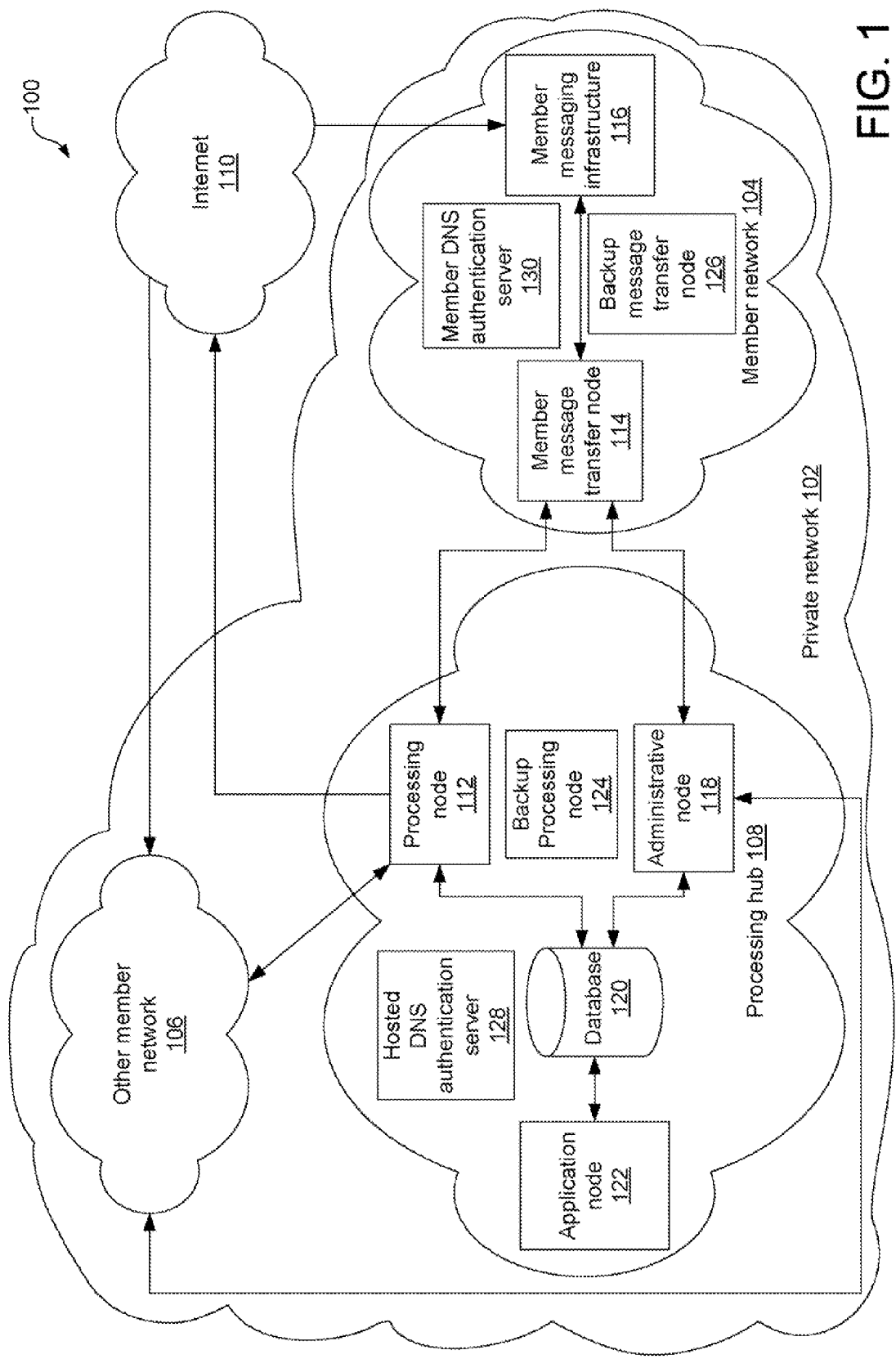
FIG. 1 illustrates an exemplary operating environment including a private network in which a private network processing hub provides various message-related services to members to ensure private network integrity and manage member reputation.

While the invention is amenable to various modifications and alternative forms specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Systems and methods are described below that overcome problems and shortcomings associated with conventional inbound message filtering, by proactively filtering outbound message traffic in a private network. In addition to outbound message filtering, the private network can provide other outbound message services to one or more member nodes and networks that are registered with the private network. Messages emanating from the members are submitted through a private network processing hub, where various processes are carried out with respect to the messages to preserve the integrity of the network and enhance members' trustworthiness as perceived by nonmembers. Among other processing, the messages may be filtered by the processing hub according to filtering attributes, and/or quarantined when a threat is detected. If quarantined, a message may be disposed of according to a delivery disposition policy. As such, the private network reduces or eliminates threats from messages emanating from the member networks, thereby improving member reputation.

In various embodiments, the processing hub can substantially ensure that threats will not be present in messages from member networks. The processing hub may create a signature or hash message ID for each message submitted or delivered through it, indicating that the message has been prescreened for threats and originated from a vetted legitimate member. As such, recipients of member messages can trust that the member messages are safe, have not been tampered with, and are authenticated to have originated from the claimed sender. Recipient non-member enterprises may "white list" members of the private network as a result of enhanced member trust. Alternatively, or in addition, nonmember recipients may become members to reap benefits of the services provided by the processing hub. In one scenario, a nonmember may become a member of the private network in response to an invitation which may be from a current member or from the private network on behalf of a member.

According to some embodiments, the processing hub provides guaranteed message delivery between members. In part because of proactive filtering of outbound messages from members by the processing hub, members do not need to worry that messages from other members pose a threat. As such, messages from members to other members have substantially reduced risk, compared to conventional filtering, that a false positive will result in incorrectly filtering out good inbound messages. Although members may still have inbound filtering functionality to filter inbound message traffic from public networks members of the private community will not need to worry about the filtration of inbound messaging from the processing hub.

Various embodiments of the processing hub prevent message pollution and threats from entering the private network and/or member networks. In these embodiments, the processing hub does not provide an open interface to accept unauthorized messages from publicly accessible networks, such as the Internet, for delivery to members. Embodiments of the processing hub do not deliver commercial marketing messages.

In some embodiments, the processing hub tracks member outbound message statistics. For example, the processing hub may track the number of bounced messages, number of threats detected, types of threats detected, source nodes of messages, intended recipients, attachment frequencies/types/sizes, and/or number of messages received from each of the other members. An audit report can be generated that is accessible to an administrator of each respective member network. The audit report can be accessed by the administrator through a web portal.

In various embodiments, policies may be specified for each member. The policies may be applied at the enterprise level, group level, division level, department level, office level, individual user member, or others. Member network administrators can create and modify policies through a web portal. Policies may specify allowed or disallowed member Internet protocol (IP) addresses which may submit traffic to the member message transfer node, allowed message domain names contained in the email envelope, group-level or user-level filtering rules, and others. Members may configure message filtering policies to be performed based on one or more criteria, such as, but not limited to, attachment types, sizes and frequencies and message content, member reputation, sender, recipient, and a combination of sender and recipient.

One or more embodiments of the processing hub provide reputation management services. Reputation management can be in the form of active or passive and immediate or long-term practices. By way of example, but not limitation, message threats can be immediately filtered when detected during submission and outbound message statistics can be monitored to facilitate determination of ways to improve reputation, threats can be proactively detected and quarantined, and members can be penalized or rewarded based on a threat-based reputation metric.

According to some embodiments of an architecture including a processing hub, one or more member message transfer nodes are deployed in the demilitarized zone (DMZ) or on the Internet edge within each member network. Each member message transfer node is registered with the processing hub and the member node is configured according to the member policy. The member node securely communicates messages outbound from the member network to the processing hub. The member node can communicate in a first protocol internally to the member network and communicate in another protocol externally to the processing hub. By way of example, but without limitations messages can be sent to the member node from within the member network using Simple Mail Transport Protocol (SMTP) and submitted by the member node to the processing hub using Extensible Markup Language (XML). Other message submission protocols can be used. In these embodiments, message spoofing is prevented in messages that are outbound from member networks.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection one with another. Based on the disclosure provided herein, one of ordinary skill in the art will appreciate a variety of ways in which connection or coupling exists in accordance with the aforementioned definition.

The phrases "in one embodiment," "according to one embodiment" and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

The term "end user" refers to a user of a computing device or other type of node within a network. Typically an enterprise has multiple end users. In various embodiments described herein, a policy can specify user-level policies, which are policies that apply to individual end users at the enterprise.

The term "member" refers to an entity that is registered with a private network. Members receive services provided by the private network processing hub. In embodiments described herein members are typically enterprises that register with a private network.

The term "enterprise" refers to a for-profit or not-for-profit organization. By way of example, but not limitation, enterprises include government organizations, companies, joint ventures, small businesses, and universities.

The term "member network" refers to a network owned, deployed, and/or maintained by a member. Member networks, can be, without limitation, local area networks (LANs) and wide area networks (WANs).

The term "member message transfer node" or "member node" refers to a node deployed in the member's network that is configured to interact with a private network processing hub. This interaction includes, without limitation, submitting messages from the member network to the processing hub, and responding to commands from the processing hub. Message transfer nodes ran be a hardware appliance, a software gateway, or one or more components (e.g., server) in the member's preconfigured messaging (e.g., email) infrastructure.

The term "nonmember" refers to an entity that is not registered with a private network. Nonmembers typically do not directly receive services provided by the private network, but are typically beneficiaries of services provided by the private network to the members.

The term "nonmember network" refers to a network owned, deployed, and/or maintained by a nonmember.

The term "private network" refers to a group of one or more member networks that utilize services of a private network processing hub. Typically, a private network will include multiple member networks and multiple processing hubs. The multiple member networks and processing hubs are typically geographically distributed.

The term "private network hub" or "private network processing hub" refers to a networked center for receiving and processing outbound member network messages, and routing only authorized messages received from public networks to the associated member network if the member has specified that such messages should be routed to the member network. Processing of member network messages can include one or more of message filtering, message tracking, threat detection, bounce management, or message signing.

The term "authorized message" refers to a message that includes trusted source indicia. In various embodiments, messages received by the private network hub are analyzed to determine if they include trusted source indicia to determine whether the messages should be transmitted to member networks. Trusted source indicia can include, but is not limited to, a recognized identifier in the message that is associated with a trusted source, a trusted communication path or port from which the message is received, or an authenticated node that submitted the message.

The term "outbound" refers to a logical direction of data flow, wherein the data flow is from, or out of, a node or a network. In embodiments described herein, outbound data flows from one or more member networks through a private network enroute to a recipient, regardless of whether the recipient is another member or a nonmember.

The term "inbound" refers to a logical direction of data flow, wherein data flow is toward, or into, a node or a network. In embodiments described herein, inbound data flows from a private network into a member network.

The term "node," refers to any logical addressable point in a network. Nodes are typically uniquely addressable, but can have multiple addresses (e.g., IP addresses) associated with it. By way of example, but not limitation, desktop and portable computers, server computers, gateways, routers gatekeepers, appliances, telephones, and terminal adaptors are all types of nodes.

The term "reputation" refers to the general opinion or beliefs that are held about an entity. In embodiments described herein, a member's reputation can be influenced by characteristics of the member's outbound message traffic. These characteristics can be, without limitation, content and/or behavior. As such, some embodiments attempt to manage reputation by observing member outbound message traffic and providing reputation management services, based on the observations.

The term "reputation management" refers to controlling or administering reputation. In some embodiments, reputation management is carried out or facilitated by observing member outbound message traffic, identifying outbound message traffic characteristics that correspond to predetermined characteristics of interest, and implementing a reputation-directed response to identification of the characteristics of interest in the outbound message traffic.

The term "message" refers to a set of one or more units of data, which when combined form a logical whole unit that has an associated sender and an associated intended recipient. In some embodiments messages are electronic mail (email) messages; but the invention is not limited to email messages. Rather, the invention could be applied to other types of messages, such as, but not limited to online chat messages (e.g. instant messages) or text messaging. For purposes of illustration, various embodiments are described with reference to email messages in the Simple Mail Transport Protocol (SMTP).

The term "pollution" or "message pollution" refers to data in a network that decreases the usefulness of a resource in some way. By way of example, but not limitation, pollution includes spam, spyware, viruses, any other type of malware, phishing messages, spoofed messages. "Bots" and "botnets" are significant sources of pollution.

The term "bot" refers to any type of software that operates autonomously as an agent of a user or another node or program. A "botnet" is a group of bots in a network. Nodes can be infected with bots.

The term "behavior-based anomaly" refers to behavior or manner of operation of a node or network that deviates from an expected behavior or manner of operation. In accordance with embodiments described herein, behavior-based anomalies can be used to detect a change in behavior of a node or network that could indicate that the node or network has been systemically altered with a bot or other long-term pollution source. As such, behavior-based anomalies are indicative of systemic or ongoing sources of pollution.

FIG. 1 illustrates an exemplary operating environment 100 including a private network 102 in which a member network 104 and other member network(s) 106 register with a processing hub 108. The processing hub 108 provides message-related services and/or other services to members of the private network 102. Message-related services are any services that are related to messages outbound from, or inbound to, a member. Reputation management services can be message-related because reputation can be affected as a result of information learned about outbound messages, steps taken to prevent delivery of threatening messages, and/or steps taken to enhance perceived trustworthiness of outbound messages. Message-related services can also include message routing, tracking, filtering, signing, certification, bounce management, disclosure statements, stationary application, and others.

Outbound message traffic from the member network 104 passes through the processing hub 108 enroute to recipients, such as recipients within the other member network 106 or a public network, such as the Internet 110. The other member network 106 includes components and/or infrastructure similar to those shown in the member network 104. Each of the networks can be wireless or wired or a combination thereof. Any of the illustrated networks may be made up of multiple sub-networks, and may be geographically distributed. For example, the Internet 110 could include ISP backbones or autonomous systems (AS). The private network 102 may have peering relationships with sub-networks in the Internet 110.

Messages flow between the processing hub 108 and the member network 104 via message transfer agents (MTA) of one or more processing nodes 112 and a member message transfer node 114. Within the member network 104, a member messaging infrastructure 116 handles messages inbound from the public network, as well as messages outbound from the member network 104. The member messaging infrastructure 116 directs messages outbound from the member network 104 to the member node 114, which send them to the processing hub 108. As such, all messages sent out of the member network 104 go through, and are processed by, the processing hub 108.

The member message transfer node 114 is administered by an administrative node 118 in the processing hub 108. Administration of the member message transfer node 114 can involve provisioning, configuration, monitoring, and software upgrading, among others. The member message transfer node 114 can optionally include certain pre-processing functions (such as part of the functions performed by the processing node 112 below).

The processing node 112 performs various services related to messages outbound from the member network 104 and the other member network(s) 106. These services include outbound message filtering. By filtering outbound member messages, member recipients can be assured that their inbound messages from other members do not pose a threat, Message traffic services provided by the processing node 112 can also include, without limitation, message tracking, quarantining, queuing, routing, message signing, bounce management, and reputation management. Services provided by the processing node 112 are discussed in more detail below.

One or more databases 120 store data related to members and message traffic. For example, a database 120 can include policies that specify member policies, group level policies, or end-user policies. Policies can set forth, for example, the types of filtering, allowed message IP addresses, allowed domain names, criteria to be tracked, and other rules. The database 120 can also include tracking data related to member outbound messages. Still further, the database 120 may include member billing information. A particular embodiment of the database 120 is discussed in more detail below.

One or more application nodes 122 enable user and computer access to data in the database 120. A network administrator of the member network 104 can use network accessible applications at the application node 122 to view tracking data and reports, as well as to view and update policies, billing, and provisioning related to the member network 104. A particular embodiment of an application node 122 is described further below.

Processing node(s) 112 monitor the outbound message traffic and provide various services that can enhance the perception of trustworthiness and reputation by recipients on the other member network 106 and recipients on the Internet 110. Within the member community that include the member network 104 and the other member network 106, messages from other members can be trusted as a result of processing performed by the processing node(s) 112. In addition, the processing node(s) 112 can apply signatures to outbound messages, whereby recipients on the public network 108 can more readily trust that the messages do not pose a threat because of outbound filtering performed by the processing node(s) 112.

By contrast, messages received by the member network 104 and the other member network 106 from the Internet 110 cannot necessarily be trusted because it is not known or readily verifiable whether messages from the Internet 110 have been filtered for threats.

According to some embodiments, one or more backup processing nodes 124 are included in the processing hub 108, and one or more backup message transfer nodes 126 are included in the member network 104. Backup processing nodes 124 and backup message transfer nodes 126 provide redundancy in case a primary processing node 112 or a primary member message transfer node 114 become unavailable. For example, if the processing node 112 goes offline, a backup processing node 124 will take its place in receiving, processing, and routing messages to and from the member message transfer node 114. Similarly, a backup message transfer node 126 will perform the functions of the member message transfer node 114 if the member message transfer node 114 becomes unavailable.

In one embodiment, the backup message transfer node 126 is an authenticated SMTP server. If the administrative node 118 determines that the member message transfer node 114 is unavailable, the processing node 112 can identify the member's SMTP server in a number of different ways, for purposes of routing inbound mail to the member network 104. In one embodiment, IP address of the backup message transfer node 126 may be specified in the member's policy. In another embodiment, the processing node 112 can lookup the public MX record for the member network 104 to determine where to submit inbound messages.

In accordance with various embodiments, the processing hub 108 is geographically distributed with multiple processing nodes 112 in different geographic locations, proximate to the member networks. In other embodiments, the private network 102 includes multiple geographically distributed processing hubs 108 and each processing hub 108 includes one or more processing nodes 112. In these embodiments, messages can be routed via the processing nodes 112 from one geographic location to another for delivery to the recipient. Routing to processing nodes 112 can be performed in such a way as to meet specified delivery or routing criteria. Routing criteria could include least cost routing, load balancing, proximity-based, or others. In proximity-based routing, a message will be routed to a processing node that is closest to the recipient before the message is transmitted onto the recipient's network, or a public network, if the recipient is a nonmember.

In the illustrated embodiment, the private network processing hub 108 includes a private network hosted DNS server 128 to enable third party authentication of message originators. The hosted DNS server 128 supports Sender Policy Framework (SPF), SenderID, Domain Key Internet Mail (DKIM), or some other sender authentication scheme so that recipients of messages from members can authenticate the originating senders through the private network. In addition, using bio-mark techniques described in U.S. patent application Ser. No. 11/372,970, filed on Mar. 10, 2006, entitled "Marking Electronic Messages to Indicate Human Origination", the message recipient can identify whether the person sending the message is the indicated sender or a human originating sender.

The member network 104 includes a member DINS server 130 that supports sender authentications such as SPF, SenderID or DKIM. Because messages from the member network 104 are sent by the processing hub 108, in some embodiments, the DNS server 130 lists a processing hub message transfer agent (MTA) IP address as a valid sending IP address.

In other embodiments, in accordance with the inclusion parameter of the SPF or SenderID specification, the IONS server 130 references the processing hub DONS server 128 to be queried in addition to the DINS server 130. In this approach, the recipient who is trying to validate the origin of the message will first perform an SPF or SenderID inquiry to the member DNS server 130. The message recipient obtains the IP address of the DNS server 128 from the member DNS server 130, and inquires to the processing hub DNS server 128 as to authenticity of the sender. The IONS server 128 will return the IP address of the processing hub 108 MTA. As such, the member does not need to keep track of its SPF or SenderID records, but rather the processing hub IONS server 128 manages the members SPF or SenderID records for the member.

In yet another embodiment, the member can configure a subdomain within the member's main domain, wherein the processing hub DNS server 128 hosts SPF or SenderID records for the subdomain. When a message is submitted to the processing hub from a member node, the sender envelope (e.g., MAIL FROM) is rewritten using the user name and a message ID hash that represents the subdomain. When the recipient queries the SPF record to authenticate the sender, the processing hub 108 can track authentication requests for a specific message. The processing node 112 can track authentication requests for specific sender envelope addresses. In addition, "out-of-band" authentication requests can be identified, in order to detect if spoofing is occurring.

In accordance with various embodiments, the interconnections between one or more member networks and the processing hub 108 can be public lines. In addition, private leased lines can be used to connect member nodes to the private network processing hub 108. In this regard, it will be understood that the private network 102 is logically a private network, even if certain interconnections make use of public infrastructure.

Figure 3:
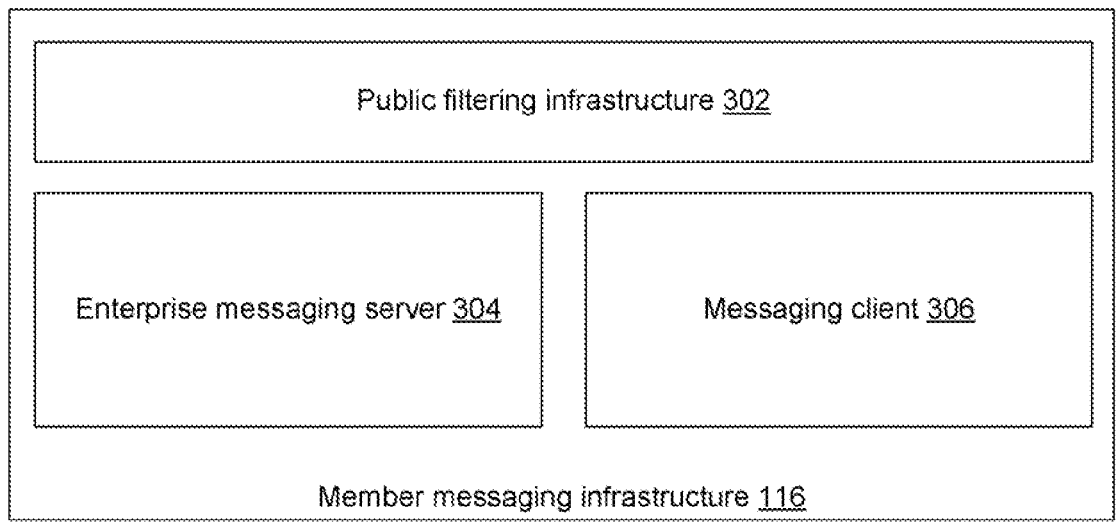
FIG. 3 illustrates functional components of an exemplary architecture of the member messaging infrastructure shown in the operating environment of FIG. 1 in accordance with one embodiment.

With more specific regard to the member network 104, the member messaging infrastructure 116 and the member message transfer node 114 handle inbound and outbound messages to and from the member network 104. With reference to FIG. 3, the member messaging infrastructure 116 typically includes a public filtering infrastructure 302 (FIG. 3), an enterprise messaging server 304, and a messaging client 306. The enterprise messaging server 304 includes one or more server computers that manage messages within the member network 104. In some embodiments, the enterprise messaging server 304 includes a Microsoft™ Exchange Server, a post office protocol (POP) server, and/or a simple mail transport protocol (SMTP) server.

The filtering infrastructure 302 can include, without limitation, conventional spam filter tools and virus filter tools to prevent malware and pollution from entering the member network 104 via inbound messages. Because inbound messages from the processing node 112 (or backup processing node 124) are trusted, the filtering infrastructure 302 does not need to, and typically will not, filter messages inbound from the processing node 112. Typically, only messages inbound from the public network 110 are filtered by the filtering infrastructure 302. The load on the filtering infrastructure 302 can therefore be reduced by the proportion of traffic load from other member networks 106.

The messaging client 306 communicates with the member message transfer node 114 to direct all outbound messages from the member network 104 through the member message transfer node 114. In one embodiment, the member message transfer node 114 sets up a secure link between an outbound submission service 202 (FIG. 2) and a message transfer agent (MTA) 508 (FIG. 5) of the processing node 112. In one embodiment, the secure link is a Secure Sockets Layer/Transport Layer Security (SSL/TLS) link between the member network 104 and the processing hub 108.

Figure 5:
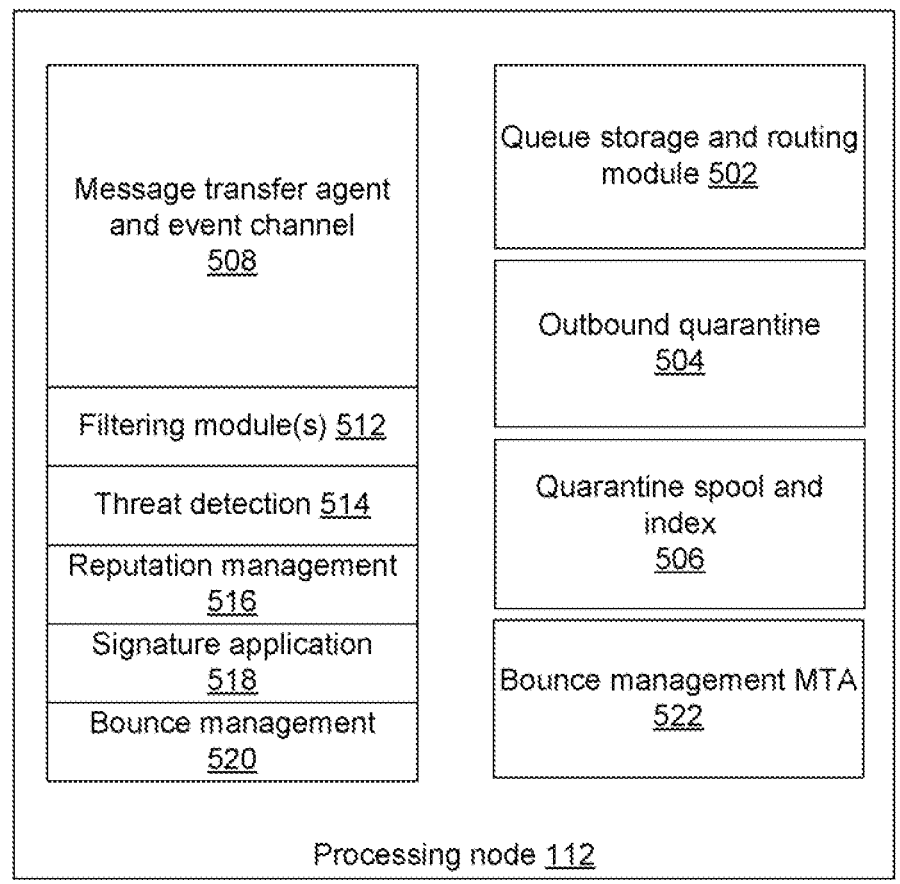
FIG. 5 illustrates functional components of an exemplary processing node shown in FIG. 1 in accordance with one embodiment.

With more specific reference to FIG. 5, embodiments of the processing node 112 can include one or more queue storage and routing modules 502, an outbound quarantine 504, and a quarantine spool and index 506. Backup processing nodes 124 include components similar to those shown in FIG. 5, so that backup processing nodes 124 can perform message processing in the same manner as the primary processing node 112.

MTAs 508 handle receipt of messages submitted to the processing hub 108 from member networks and delivery of messages out of the processing hub 108. MTAs 508 include an event channel that applies filtering rules to the message traffic to detect threats and facilitate management of members' reputation. In this regard, the MTAs 508 and event channel include, for example, one or more filtering modules 512, threat detection modules 514, reputation management modules 516, signature application modules 518, and bounce management modules 520.

Filtering modules 512 filter messages based on filtering policies set forth in members' policies. Some exemplary criteria upon which messages can be filtered are, without limitation: message content, attachments, sender, recipient, combination of sender and recipient, reputation, spam, and viruses. For example, with regard to filtering on content, filtering can involve searching message content (e.g., text) for specified words, phrases, patterns, etc. As another example, filtering could involve identifying any messages with attachments, or messages with more than a certain number of attachments, or certain types of attachments (e.g., graphics, photos, audio, text, etc.).

Threat detection modules 514 detect threats posed by messages. Threats can include, without limitation, bots, botnets, spam, viruses spyware, adware or other malware. Bots and botnets can pose a significant threat because they indicate that a node on the network has been taken over by malicious code and is being controlled to send threatening messages. As such, particular action may be taken to stop botnet activity. For example, when a bot is detected, the MTA nodes 508 can selectively prevent delivery of all messages being sent from the bot. Advantageously, messages from a bot on a network can be stopped, without stopping delivery of other nonthreatening messages being sent from the network.

Threats detected in messages are filtered out within the processing hub 108 to ensure private network integrity and enhance member to private network trust. In this regard, viruses, worms, and other threats are filtered out at the processing hub 108.

In one embodiment, the threat detection module 514 computes a spam score for each message. The spam score indicates the likelihood that the message is spam. The spam score can be computed using heuristic tests or other analyses. The spam scores can be tracked and stored, and can be used as a message attribute upon which messages are filtered.

Detected threats, among other criteria, can be used by the reputation management module 516 to compute a measure of reputation, such as a reputation score associated with the members. The reputation measure is representative of a member's reputation. The reputation measure can be used in a number of ways and for a number of purposes. In accordance with one embodiment, there are two contexts in which reputation measures may be used: to identify an immediate message action and to establish long-term member or end-user actions.

With respect to immediate message action, the filter module 512 can immediately filter out a single message based on the senders reputation score, and some action (e.g., deny, blind carbon copy (bcc), etc.) can be taken on the single message. As another example, if reputation falls below a specified threshold level, the member may be penalized. Alternatively, if the reputation reaches or stays above a specified upper threshold, the member may be rewarded. As such, numerous reputation recognition and feedback mechanisms can be used.

When a threat is detected in a message, the threatening message may be quarantined in the outbound quarantine 504. The outbound quarantine 504 holds messages until they are disposed of in accordance with the members' quarantine policies. In some cases, the messages are held for further inspection, for example, by a network administrator. Upon further inspection, it may be determined that a quarantined message does not actually pose a threat, and may then be transmitted to the intended recipient. If, after further inspection, it is determined that the message does pose a threat, the network administrator can take further action, such as identifying, fixing and/or removing the node from which the message was sent. Other dispositions may be applied to quarantined messages. For example, the quarantine 504 may keep messages indefinitely, or for a specified amount of time, after which the messages are deleted.

The quarantine spool and index 506 keeps track of messages in the outbound quarantine 504. When the messages entered the quarantine 504 and/or the order of disposition of messages in the quarantine 504 are tracked by the quarantine spool and index 506. In some cases, messages in the quarantine will be delivered to the original recipient or back to the sender, or another user specified in the member policy. In these cases, the quarantined messages are routed by the queue storage and routing module 502.

Referring to the signature application module 518, a unique message identifier or marker can be applied to each message. In one embodiment, the message ID is a hash ID, which is created and inserted into the message. The hash ID may be inserted into a header of the message. The message ID will indicate to the message recipient that the message was prescreened and originated from a legitimate member of the private network. All of the message IDs are saved in the database 120, and can be used to track the messages. For example, using a message ID, queries can be made about attributes and disposition of the corresponding message. Message IDs can be used by a message recipient to authenticate the sender of the message. As discussed at other points herein, sender authentication can be carried out using DNS SPF, SenderID, DKIM, or other authentication mechanisms. In addition, message IDs are used in message bounce management.

In order to maintain a pollution free environment in the private network, the private network processing hub 108 will not receive unauthorized messages from the public Internet. However, one exception to this relates to bounce management. Various embodiments of the private network processing hub 108 include a bounce management MTA 522 that is open to the public in order to receive bounce messages that originate from the processing hub 108. In one embodiment, a bounce management module 520 analyzes received bounce messages for tracking purposes and to distinguish authorized bounces from unauthorized bounces.

Figure 7:
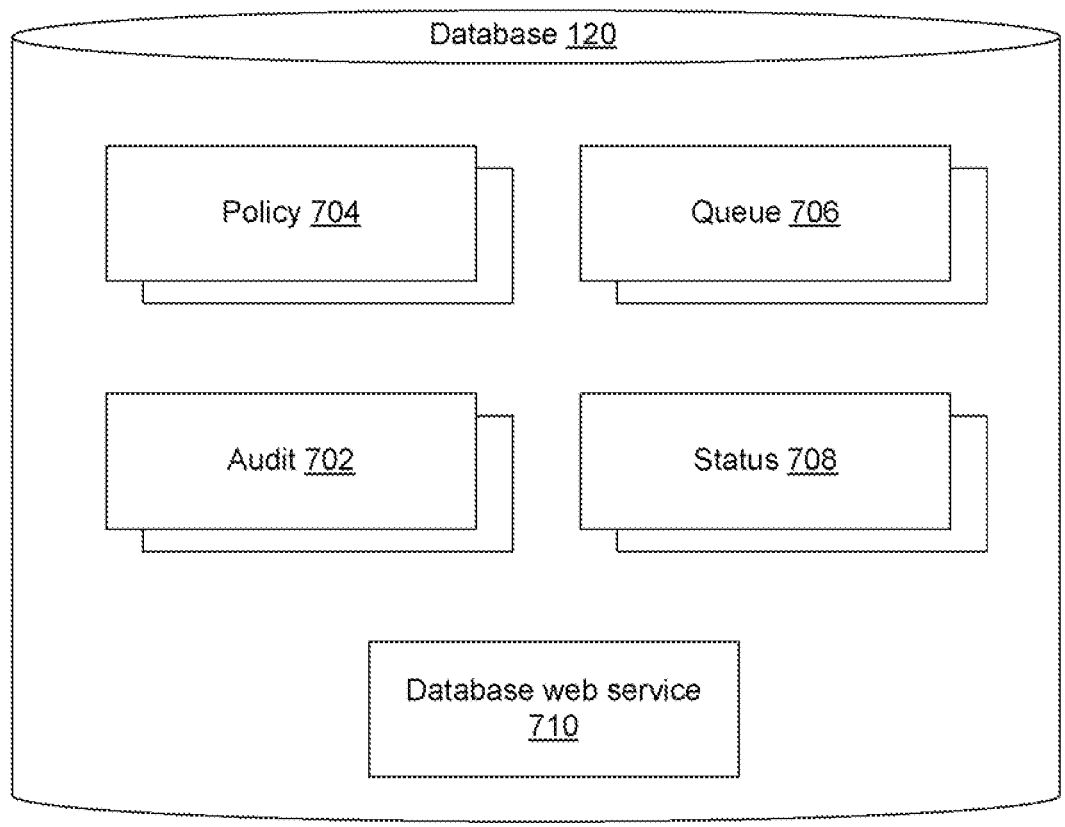
FIG. 7 illustrates components of an exemplary database including member and outbound message-related data which may be employed in the environment of FIG. 1 in accordance with one embodiment.

In one embodiment, the Variable Envelope Return Path (VERP) technique is used. Before the MTA 508 sends an outbound message, the signature application module 518 replaces the original envelope sender address with a hash ID. To illustrates if the hash ID is ABCDEF12345, then "member_user1@member.com", can be replaced with "ABCDEF12345@privatenet.com". If the message bounces back, the bounce management module 520 can determine that the message originated from the processing hub 108. In this regard, messages inbound to the private network processing hub 108 from the Internet 110 are considered to be authorized messages if they include a recognized hash ID in the sender name section of the bounced message. Messages received from the Internet 110 that do not have a recognized hash ID in the sender name section are not authorized and the processing hub 108 will prevent those unauthorized messages from entering member networks. In addition, the bounce management module 520 can use the hash ID (ABCDEF12345) to look up specific information (e.g., in the audit database 702 (FIG. 7)) about the message and track the message as a bounce. Bounce messages from both members and nonmembers can be tracked.

The bounce management module 520 uses the member's bounce policy to determine the appropriate disposition of the bounce message. Various options may be available for the member to choose from. For example, bounce messages could be bounced back to the original sender or not bounced back to the original sender. Bounce messages could be submitted to a specified bounce MTA within the private network. One benefit of the bounce management module 520 is insulation of the private network from forged bounce messages and spam that poses as legitimate bounce messages. The bounce management module 520 can identify spoofed emails posing as a bounced message if the sender envelope includes a nonexistent or invalid hash ID. If the bounce management module 520 determines that a bounce attack or flood is occurring, remedial action can be taken to prevent harm to the processing hub 108. In addition, handling of bounced messages is delegated to the processing hub 108 and carried out according to the member policy.

Typically, spoofed spam attacks, also known as back-scatter, are directed at the member's public internet message MTA, rather than the private network. As such, the bounce management module 520 handles messages that are sent to it explicitly. As discussed further below, messages are generally sent directly to the bounce management module 520 as a result of a bounce reply that includes a variable envelope return path (VERP) address, or as a result of a malicious attempt to spam or flood the bounce management MIT 522. The bounce management module 520 can use the VERP address to filter the incoming messages.

Figure 6:
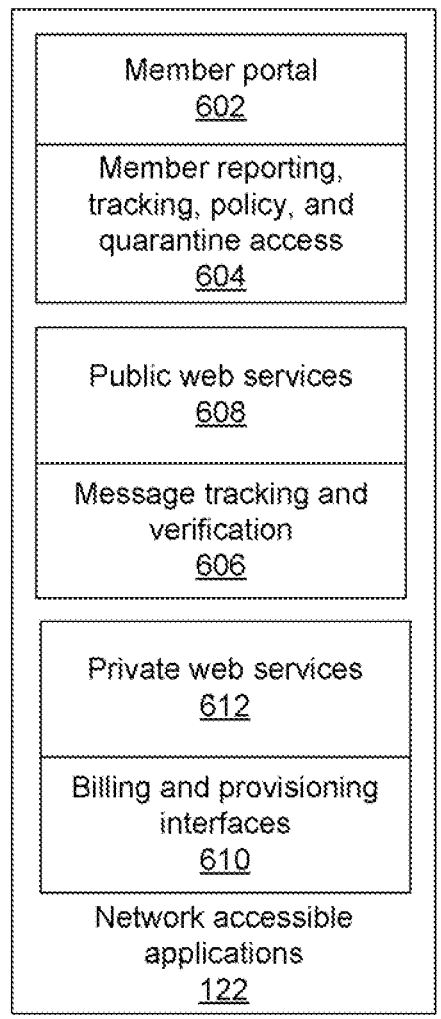
FIG. 6 illustrates functional components of an exemplary application node shown in FIG. 1 in accordance with one embodiment.

Data gathered by the MTA nodes and event channels 508 can be logged in audit reports 702 (FIG. 7) of the database 120. Administrators of the member network 104 can access the audit reports through a member web portal 602 (FIG. 6). The administrator can build and/or access audit reports 702 through member access module 604 via the web portal 604.

Message tracking performed through the member portal can include tracking one or more statistics associated with outbound messages. The statistics may include one or more of:

the total number of messages;
the total number of messages suspected of being spam;
the total number of messages suspected of containing a virus;
the average number of messages originated;
the average number of messages originated within a predefined time interval;
the average size of messages originated;
the largest size message originated;
the maximum size permitted to be originated;
the average number of recipients to which messages originated are addressed;
the largest number of recipients on a particular message originated;
the maximum number of recipients permitted to be addressed on an outbound message;
the frequency of recipients;
the address format (e.g. pretty name) employed;
the average number of message header lines in messages originated;
the maximum number of message header lines in messages originated;
the average Bayesian spam filter probability score for messages originated;
the number of messages with attachments;
the number of messages with attachments of certain types or groups of types (e.g., .exe, .com, .sys, .dll, .scr, .cpl, .api, .drv, .bpl, .zip, etc.);
the number of messages sent via a particular mailer;
the number of messages that include content from a particular character set; and
standard deviations relating to the foregoing.

Using the message ID, nonmember MTAs and/or public recipient MTAs that receive member messages can access message tracking and verification module 606 via a public web service 608 to verify that the messages did emanate from the private network 102. Tracking and verification module 606 can be accessed to track the history and/or disposition of message. For examples a user can determine whether a particular message was received by the recipient, bounced, quarantined, included a threat, or other disposition. In addition if a member has specified in its policy to track authentication queries of that member's outbound messages, the member can use the portal to track Domain Name System (DNS) Sender Policy Framework (SPF), SenderID, DomainKeys Identified Mail (DKIM) or other email authentication queries that have been made on each message.

Member administrator billing and provisioning applications can access billing and provisioning interfaces 610 via private web services 612. Optionally, the Billing Services module 610 works with the audit database 702 to keep track of the billing amount to each member. Such amount can be based on credit or debit calculated from one or more of the following: (i) the number of users served by the member node, (ii) the number of outbound messages to other members, (iii) the number of outbound messages to the public network, (iv) the number of inbound messages, (v) the amount of outbound traffic bandwidth to other members (vi) the amount of outbound traffic bandwidth to the public network, (vii) the amount if inbound traffic bandwidth, (vii) the amount or percentage of bad traffic (messages filtered by system-wide spam/virus policies and members' content policies) submitted, (ix) the duration of the retention period for the quarantined messages, (x) the duration of the retention period for member data stored in the audit database, and (xi) the overall reputation score of the member node; and the associated per unit rates for these quantities.

Referring again to the database 120, policies 704 are stored and can be accessed and edited by the member administrator through the web portal 602. In various embodiments, policies can specify numerous aspects of message processing. By way of example, but not limitation, the administrator could specify the following in the policy:

- content and/or attribute filtering,
- outage procedures when the member message transfer node fails,
- value-added features performed during message processing,
- response procedure if a bot is detected,
- steps to take for quarantined messages,
- bounced message response and disposition actions,
- email authentication tracking,
- customization of HTML message stationary or templates,
- message manipulation prior to sending to recipient.

With regard to content filtering, the administrator could specify that message profanity, pornography, or other undesirable or questionable content be filtered for tracking purposes and/or for quarantining. With regard to attribute filtering, using SMTP to illustrate, the administrator can designate messages be filtered and tracked based on one or more of the following SMTP attributes:

- MAIL FROM parameter,
- checksum,
- HELD Strings,
- headers (e.g., RFC 822 headers),
- total size,
- number of attachments,
- total size of attachments,
- messages with HTML,
- messages with text,
- message with multiple parts,
- messages with self-contained images,
- spam score,
- source IP address,
- IP address of client sender,
- IP address of member message transfer node,
- IP address of enterprise server Content and attributes that are filtered out are stored in the audit database in association with corresponding message IDs, where they can be analyzed further. For example, using the message ID discussed above, the administrator can query what content was associated with a particular message and the sender or recipient IP addresses.

With regard to bot response, the administrator may specify in the policy where to send notification of a detected bot, and what action should be taken in response to the bot. Regarding quarantining procedures, the administrator could specify one of various disposition options for quarantined message. Possible dispositions could include automatic message delivery after a designated time period, automatic non-delivery and deletion of the message after a specified time period, keep quarantined until released by the administrator, send the message to a specified member user, or others.

With regard to outage procedures when the member message transfer node fails, or is otherwise unavailable, the administrator can specify redundancy remedies in the policy. Redundancy remedies identify a backup message server that inbound messages should be sent to, and from which messages will be sent. Regarding message manipulation prior to sending, the administrator can specify that certain features be applied to all outbound messages, such as application of a standard enterprise stationary to the messages.

In accordance with one embodiment, when an attachment is filtered, it is extracted from the associated message and stored (e.g., in an attachment vault), and a link to the attachment is inserted into the message prior to sending the message. When the recipient receives the message, the recipient can access the attachment by clicking on the link. As such, attachments, which can often be a source of threats and other pollution will not automatically be delivered to a recipient network and computer.

In some embodiments, through a web portal the member network administrator may specify policies through text/data entry and/or be offered a menu of options to select from. For example, the member can choose to "opt-in" to features or processing provided by the processing hub.

Queuing data 706 and member/message status data 708 are also stored in the database 120. A database web service 710 provides an interface to the database 120 for accessing applications.

Figure 2:
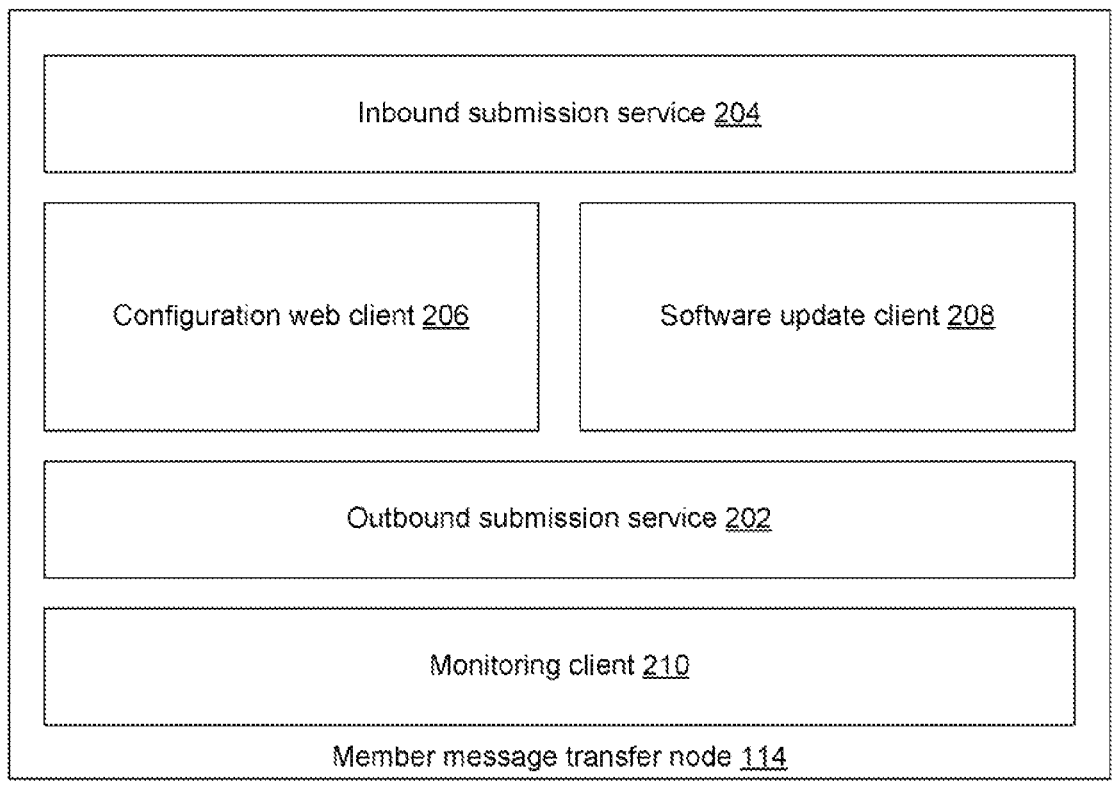
FIG. 2 illustrates functional components of an exemplary architecture of the member message transfer node shown in the operating environment of FIG. 1 in accordance with one embodiment.
Figure 4:
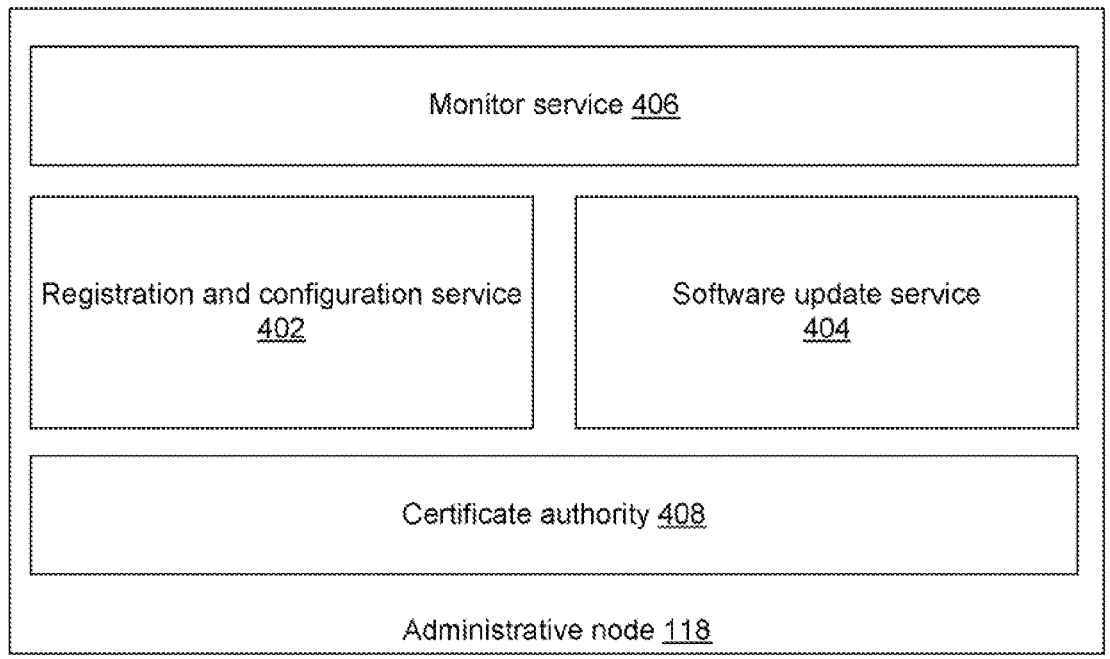
FIG. 4 illustrates functional components of an exemplary administrative node shown in FIG. 1 in accordance with one embodiment.

Referring again to the member message transfer node 114 and FIG. 2, inbound submission service 204 (FIG. 2) receives messages from the private network MTAs 508 and 522. A configuration web client 206 interacts with a registration and configuration service 402 (FIG. 4) of the administrative node 118 to register and receive configure for the member node 114. A software upgrade client 208 interacts with a software update service 404 of the administrative node 118 to receive software updates. A monitoring client 210 communicates with a monitor service 406 of the administrative node 118 to demonstrate that the member node 114 is available. In one embodiment, the member node 114 communicates with the network administrative node 118 via XML RPC. The administrative node 118 also includes a certificate authority 408. The certificate authority 408 issues digital certificates to the member node 114 to facilitate secure communication between the member node 114 and the processing hub 108.

In various embodiments, more than one private network 102 can be operated at the same time by the same provider or different providers. In one such embodiment, the private networks may establish peering agreement(s) among them. In another embodiment, the private networks may each establish a peering agreement with a common gateway instead of peering directly with each other. Such peering agreement(s) may cover honoring of each other's certificate authority, reputation and other filtering policies, thresholds standards, trusted messages display icons, and other technical arrangement, in addition to monetary terms based on quantified traffic data, some examples of which are discussed above with regard to the billing interface 610. Each private network's 102 processing hub 108 includes additional processing node(s) and conduit(s) to accommodate such peering arrangement(s), either peer-to-peer or through peering gateway(s). Peering gateways should have their own processing nodes and other management modules to accommodate such setup of network(s) of private networks, Exemplary Operations FIGS. 8-14 illustrate processes that can be carried out by computing devices, such as the computing device illustrated in FIG. 15. In some embodiments, the processes are carried out within an operating environment such as the operating environment shown in FIG. 1. The processes may be embodied in computer-executable instructions to cause a computer to perform the processes. It is to be understood that the invention is not limited to the orders of operations illustrated in the embodiments below. The operations can be reordered as may be suitable for any particular implementation. In addition the illustrated operations can be combined rearranged, and/or broken out in various ways, without departing from the scope of the present invention.

Figure 8:
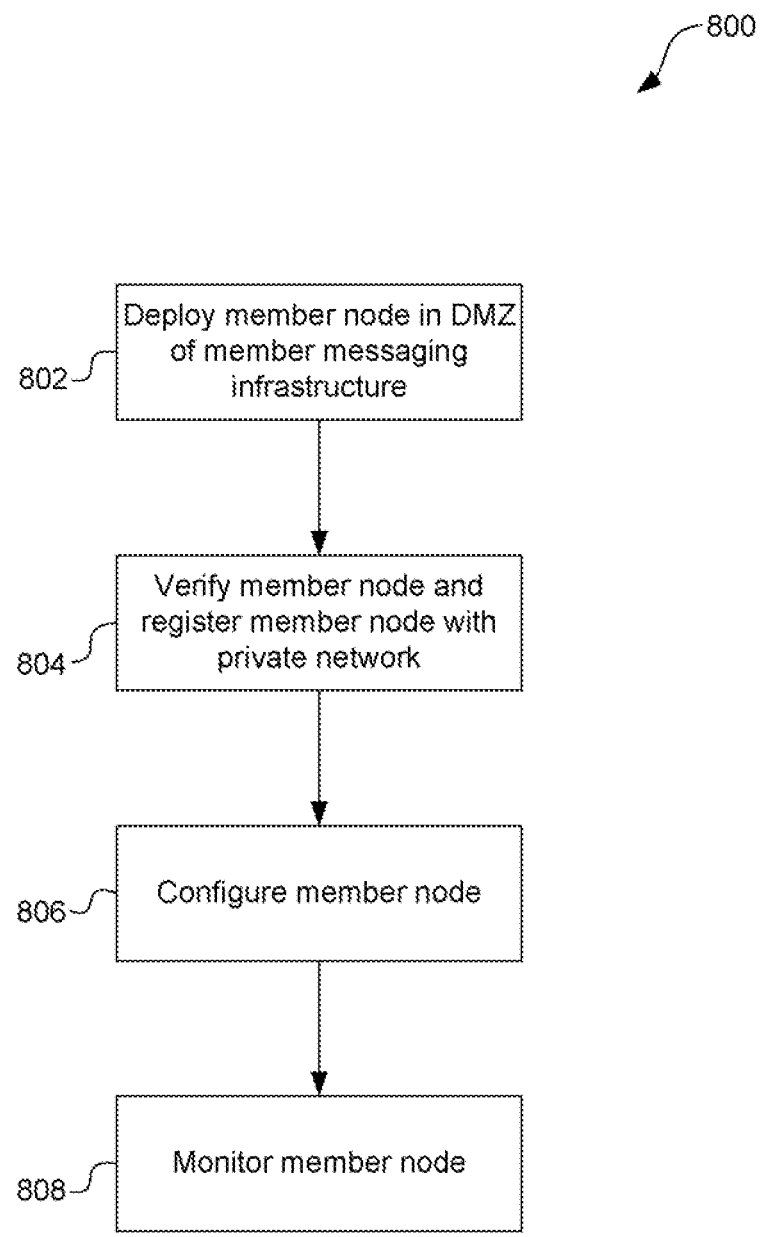
FIG. 8 is a flowchart illustrating a process for provisioning and administering a member message transfer node in accordance with one embodiment.

FIG. 8 is a flowchart illustrating a provisioning and administering process 800 for provisioning and administering a member message transfer node within a member network in accordance with one embodiment.

In a deploying operation 802, the member message transfer node is deployed to a member network. The deploying operation 802 could include physical installation, and may also include configuring the member message transfer node to work with the member network's message exchange server. A registering operation 804 registers the member message transfer node with the private network. In various embodiments, the member message transfer node is registered with a member message transfer node administrator at the private network. Registration involves the appliance uniquely identifying itself to the private network, so that the private network can determine whether the member message transfer node is authentic and valid. In one embodiment the member message transfer node identifies itself with a digital certificate, and the private network verifies the authenticity of the certificate.

A configuring operation 806 configures the member message transfer node by setting it up to work with the private network administrator and MTAs. Configuring involves provisioning the member message transfer node by downloading (or uploading) software (e.g., data and/or executable programs) to the member message transfer node. For example, a member policy, or a portion of a member policy, is typically loaded on the member message transfer node to cause the member message transfer node to apply front line filter rules, and other rules to outbound messages transmitted from the member network. The data and software may include one or more keys as part of a Public Key Infrastructure (PKI).

After the member message transfer node is deployed, registered and configured, a monitoring operation 808 monitors member message transfer node operation. Monitoring may be performed by the member message transfer node administrator at the private network. The monitoring operation 808 may involve monitoring for a periodic heartbeat signal from the member message transfer node or pinging the member node to determine availability.

Figure 9:
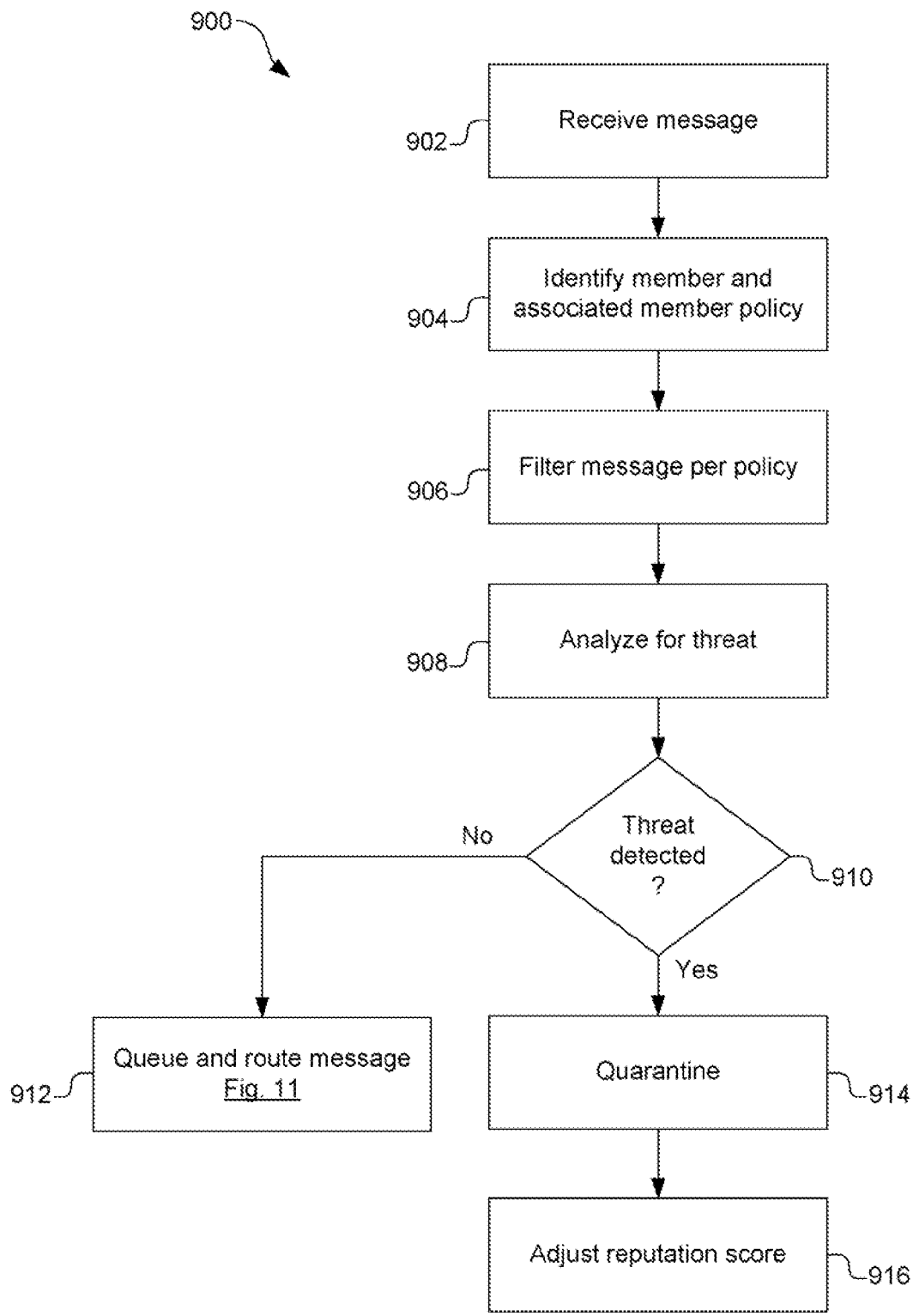
FIG. 9 is a flowchart illustrating a process for monitoring outbound messages from a member in order to create trust among members in the private network and quantify member reputation in accordance with one embodiment.

FIG. 9 is a flowchart illustrating a process for carrying out transactions based on outbound messages from a member of the private network, whereby trust can be built among members and nonmembers' perception of members' trustworthiness can be enhanced.

In a receiving operation 902, a message is received from an end user node on a member network. An identifying operation 904 identifies the member and the member's policy. A filtering operation 906 filters the message according to the member's policy. An analyzing operation 908 analyzes the message to determine if the message includes pollution that is a threat.

Figure 11:
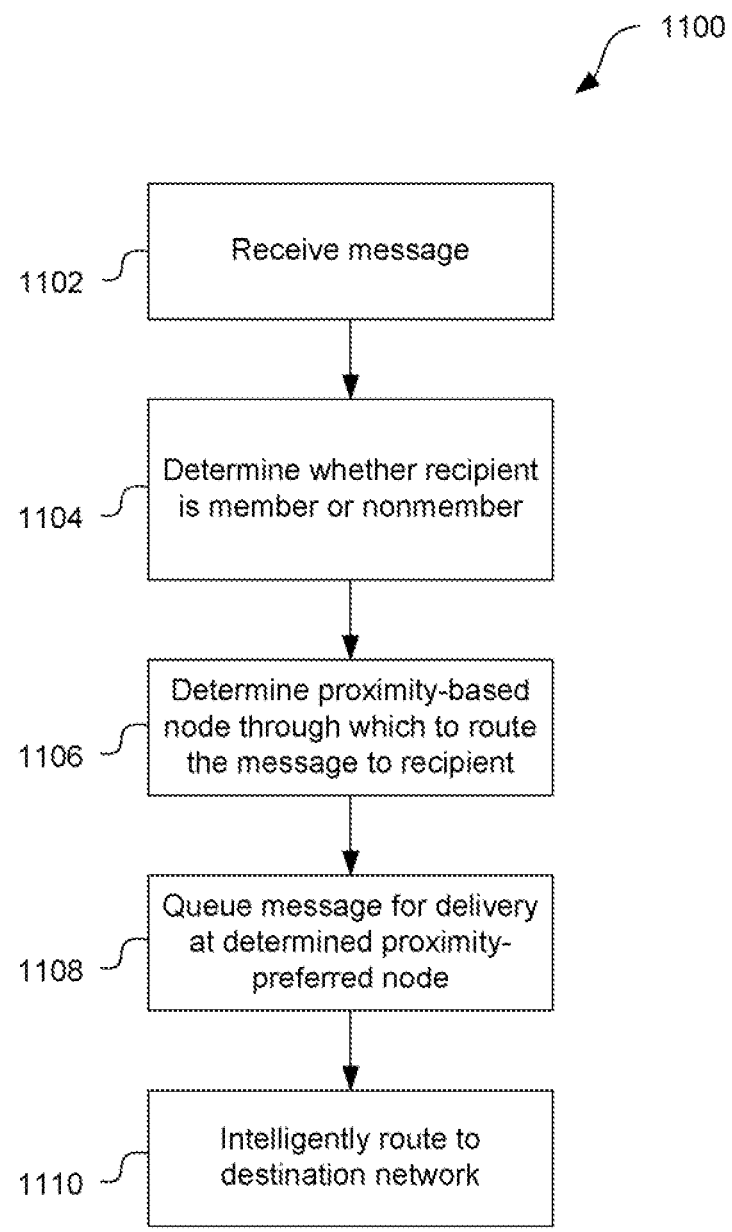
FIG. 11 is a flowchart illustrating a process for routing messages from a member to recipients in accordance with one embodiment.

A query operation 910 queries whether a threat is detected in the message. If no threat is detected, the process 900 branches "No" to a queuing operation 912, which queues the message for routing to the recipient. An exemplary queuing and routing operation is illustrated in FIG. 11.

On the other hand, if query operation 910 determines that a threat is detected in the message, the process 900 branches "yes" to a quarantining operation 914. In one embodiment of the quarantining operation 914, the message is stored in and outbound quarantine area, where it can be kept for later analysis. And adjusting operation 916 then adjusts a reputation score of the member based on the detected threat, and/or other statistics.

Figure 10:
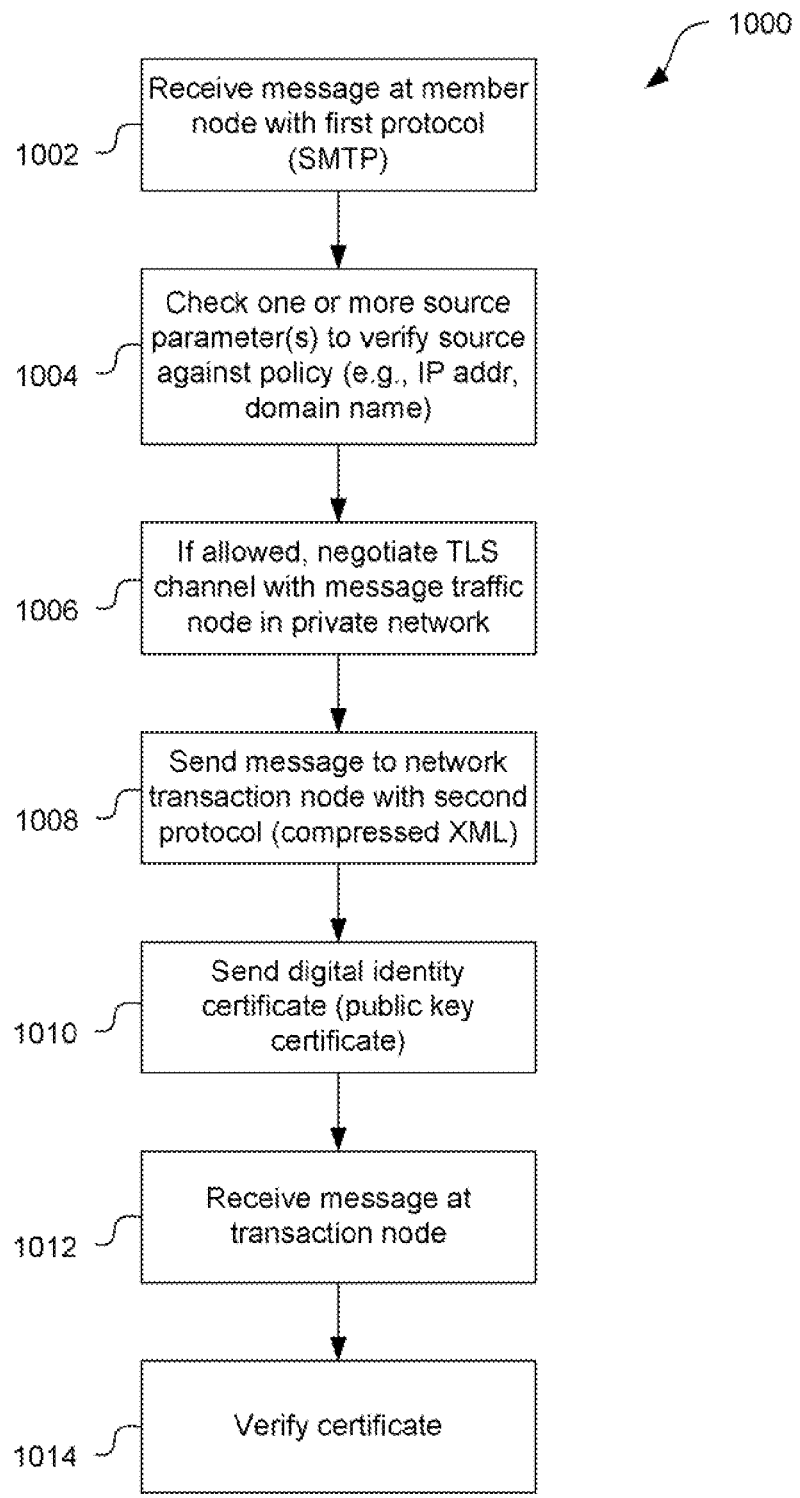
FIG. 10 is a flowchart illustrating a process for submitting outbound messages to the private network processing hub from a member in accordance with one embodiment.

FIG. 10 is a flowchart illustrating a process 1000 for submitting outbound messages to the private network from a member in accordance with one embodiment. The process 1000 can be carried out in a trusted network environment such as the environment shown in FIG. 1.

A receiving operation 1002 receives a message at a member message transfer node in the DMZ of the member's network. The message is received according to a member internal message protocol, such as SMTP. In a checking operation 1004, the member message transfer node checks one or more source parameters of the message to verify the source of the message against the member policy. Exemplary source parameters that could be checked are IP address and domain name.

If the checking operation 1004 determines that the message is from an allowed source a negotiating operation 1006 negotiates a secure channel with the message traffic node of the private network. In one embodiment a SSL/TLS channel is negotiated. In a sending operation 1008, the member message transfer node securely sends the message to and MTA at the private network in out external message protocol, such as XML format. In various embodiments, submission to the private network can be performed through backup MTAs if the primary MTA is unavailable.

Another sending operation 1010 sends identification indicia, such as a digital certificate, to the MTA. In one embodiment, the certificate is a public key certificate. The identification indicia are used to authenticate the identity of the sending member message transfer node. This prevents unknown nodes from sending messages into the private network MTA. In a receiving operation 1012, the sent message and certificate are received by the MTA. A verifying operation 1014 then verifies the certificate. If valid the message is approved for outbound processing in the private network.

If the member message transfer node is unavailable (e.g., not operating), in some embodiments, a backup qualified node can submit the message from the member network to the private network. In these embodiments, the backup server may be a configurable host server, such as an exchange server, that submits SMTP authenticated messages into the private network. In these situations, the MTA at the private network receives the message via an authenticated SMTP.

In accordance with various embodiments, when messages are being submitted into the member network, they are submitted in XML to the member message transfer node under normal operating conditions. If the member message transfer node becomes unavailable (e.g., crashes), a redundant inbound message server can be utilized. In some cases, the MTA at the private network uses the domain name system (DNS) to look up the public mail exchange (MX) server record of the member network, and submits the message to the listed server.

FIG. 11 is a flowchart illustrating a process 1100 for routing messages outbound from a member network to message recipients in accordance with one embodiment. The process may be carried out in a trusted network environment such as the environment shown in FIG. 1.

In a receiving operation 1102, a message is received by a private network MTA from the member network. It is assumed that authenticity checks and message filtering has been performed and determined that the message is allowed to be delivered to the intended recipient, A determining operation 1104 determines whether the recipient is a member or nonmember to determine how to route the message.

In another determining operation 1106, a preferred node is determined based on logical proximity of the recipient to the MTA. The preferred node may be a node outside the private network, in the case of a nonmember recipient, or the node may be a node within the private network, in the case of a member recipient. Choosing a routing node based on logical proximity can have benefits of more efficient or faster routing and delivery.

In a queuing operation 1108 the message is queued for delivery at the determined proximity preferred node. In a routing operation 1110, the message is intelligently routed toward the recipient. In accordance with some embodiments, the routing operation 1110 utilizes an anycast or multicast addressing scheme. In some embodiments, the private network has a peering arrangement with a backbone network, whereby the private network MTA can identify efficient routes for the message based on various routing criteria. In other embodiments, member nodes may be directly connected to the private network with private leased lines, which are only used for the purpose of interacting with the private network.

Figure 12:
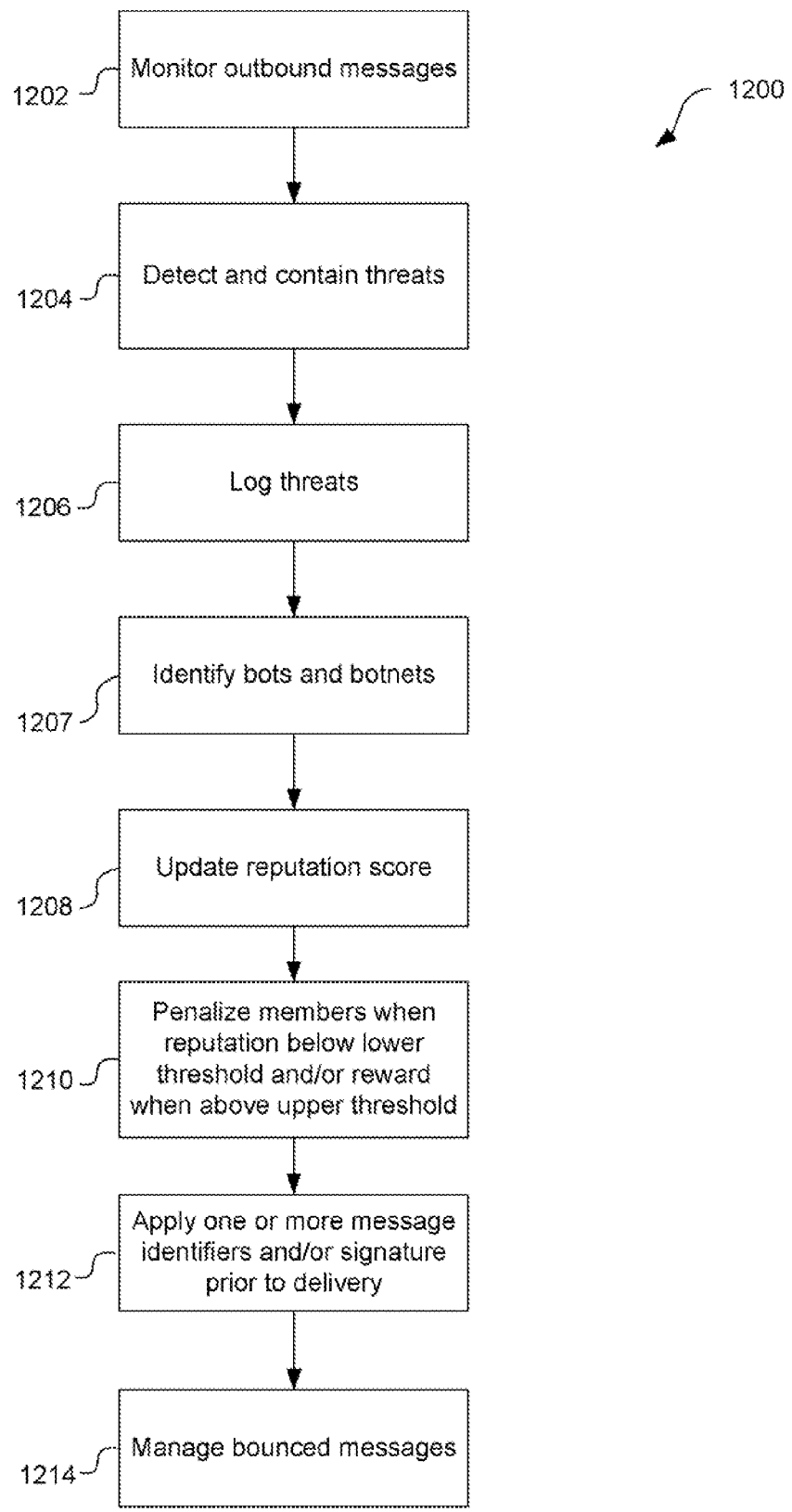
FIG. 12 is a flowchart illustrating a process for managing reputation based at least in part on outbound message monitoring in accordance with one embodiment.

FIG. 12 is a flowchart illustrating a process 1200 for managing member reputation based at least in part on outbound message monitoring in accordance with one embodiment. The process may be carried out in a trusted network environment such as that shown in FIG. 1.

A monitoring operation 1202 monitors outbound message traffic from the member network. A detecting operation 1204 detects and contains any threats found in outbound messages. A logging operation 1206 logs the detected threats. An identifying operation 1207 identifies bots and botnets operating on the member's network. Identifying bots and botnets can be performed by detecting behavior-based anomalies. Behavior-based anomalies may be identified by analyzing message characteristics, such as, but not limited to,

- message volume per hour
- message trends over days
- sudden changes in end user agent The member's reputation score may be updated 1208 based on detected threats and/or bots. Depending on threat characteristics, such as types, and numbers, the reputation score may be reduced. In a penalizing operation 1210, the member may be penalized if the reputation score falls below a minimum value. Penalties may include loss of access to services, higher service fees, member guarantees to address an in-network source of pollution, or others. In an applying operation 1212, one or more message identifiers are inserted into the outbound message by the MTA for various purposes. Exemplary types of message IDs and/or signatures that can be inserted are,

- a message tracking ID,
- an integrity checksum signature,
- a bounce tracking message ID,
- a sender authentication tracking message ID.

In one embodiment, the message tracking ID is a hash ID of one or more parts of the message, or the entire message along with attachments and/or the sender address or another network address in some encrypted form. With the message tracking ID, an external call-back request can be made to validate the origin of the message review message details and/or to receive delivery status of the message.

An integrity checksum signature is a header that is inserted into the message. The integrity signature can be used to verify that the message has not been modified during transmission, or to validate that the message originated from the indicated sender and went through the private network. In some embodiments, the signature is a checksum or hash over one or more parts of the message. The bounce tracking ID is a hash of one or more parts of the message that is inserted into the message, and replaces the sender envelope ID.

The sender authentication tracking ID is hash of one or more parts of the message that is inserted into the host portion of the sender envelope as a sub-domain name. The hash may also be a concatenation of a number of other hash values. The sender authentication tracking ID may also include an encrypted form of the sender's address and/or another network address. Thus, for example, if the hash ID is "12345ABCDEF", the sender envelope "joe_sender@joe_domain.com" may be replaced with joe_sender@12345ABCDEF.private_network.com". When a third party performs an authentication request using the subdomain, the authentication request can be tracked if the member has specified in its policy that it wants to track DNS authentication requests.

If the message is rejected (e.g., bounces) from the recipient network a managing operation 1214 handles the bounced message. In one embodiment, the bounce management operation 1214 identifies authorized bounced messages using a VERP address verification mechanism. In this approach, a bounced message is validated by determining whether the SMTP sender address includes a valid hash ID that was inserted into the message prior to the message being sent. If the sender information matches a valid hash ID, the bounce message is determined to have been caused by a message that was sent by the processing hub. Using the hash ID, the message can be identified as a bounced message and tracked appropriately.

Figure 13:
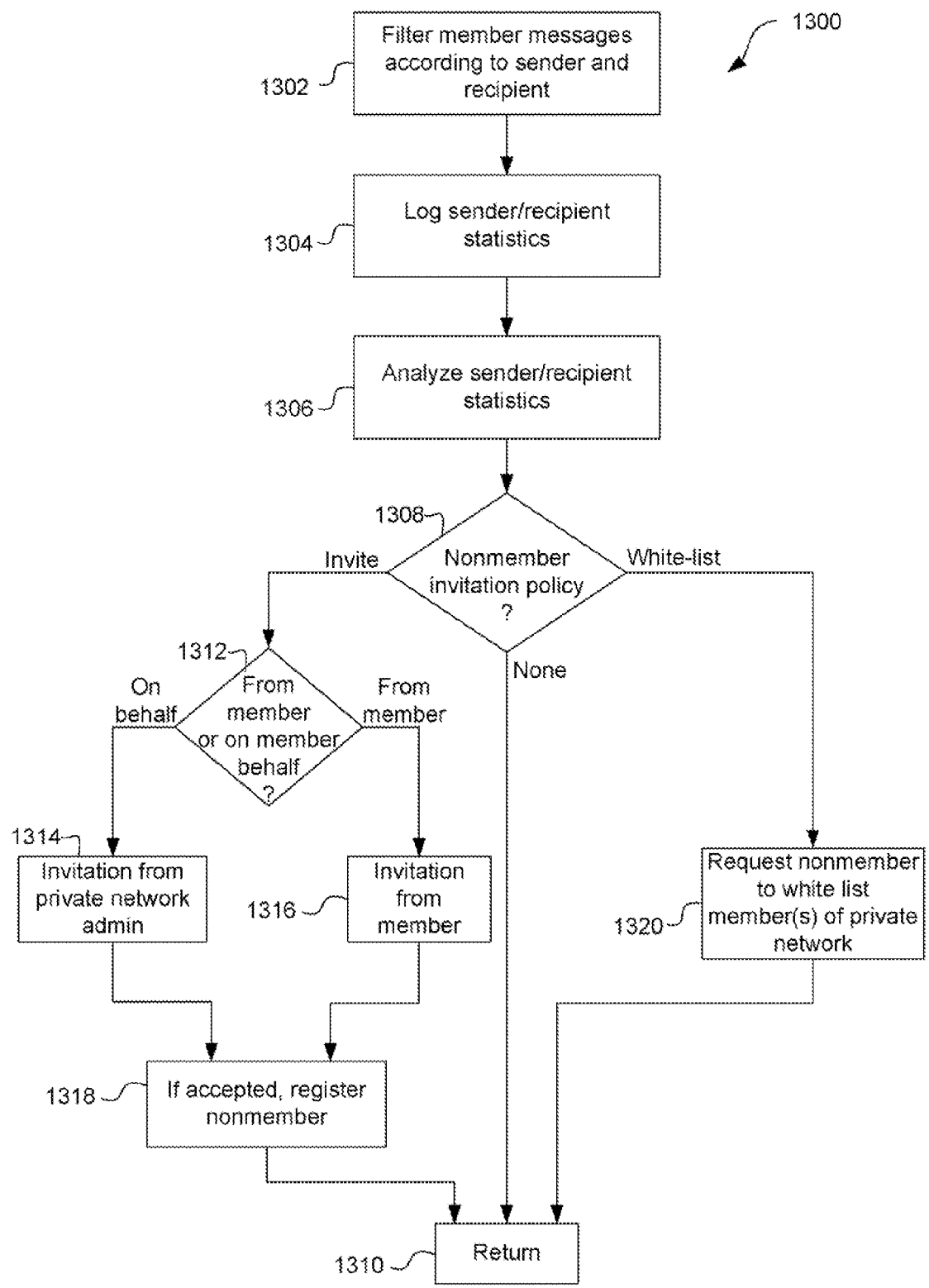
FIG. 13 is a flowchart illustrating a process for relationship management in accordance with one embodiment.

FIG. 13 is a flowchart illustrating a process 1300 for relationship discovery in accordance with one embodiment. The process 1300 may be carried out in a trusted operating environment such as the environment shown in FIG. 1, in which outbound messages from member networks are filtered and routed through a private network processing hub. As discussed above, in various embodiments a hash ID is created for each outbound message sent from the processing hub, and the hash ID can be used to validate that the corresponding message originated from the member network and/or to retrieve delivery status of the message (e.g., from an audit database).

In a filtering operation 1302 member network messages are filtered according to message sender and message recipient. In one embodiment, a filter module at an MTA node extracts sender ("From") information and recipient ("To") information from email messages. In a logging operation 1304, the extracted sender and recipient information is stored. Sender and recipient data can be stored in an audit database.

An analyzing operation 1306 analyzes the stored sender and recipient data. In some embodiments of the analyzing operation 1306 a report is generated that shows the number of messages being sent to identified recipients. The recipients may be identified by domain name, corporate name, IP address or otherwise. The analysis may also include statistics about the recipients, such as whether they are members or nonmembers, domain "whois" information, size, location, market place, etc.

In a query operation 1308, it is determined whether a nonmember invitation process is triggered and, if so, the invitation policy to be applied. In some embodiments, if the number of messages sent to a certain recipient is more than a specified threshold, the invitation process is triggered. The query operation 1308 then determines the member's invitation policy. The member's invitation policy can specify that an invitation should be sent, a request for white-listing be made, or neither. If neither are selected, the process 1300 branches "None" to a return operation 1310, wherein the process 1300 ends.

However, if the invitation policy indicates that an invitation is to be made, the process 1300 branches "Invite" to another query operation 1312, which determines whether the invitation is to be sent directly by the associated member, or the invitation is to be sent by the private network administrator on behalf of the member network. Again, the member's policy can specify the manner in which an invitation is to be made. If the invitation is to be made on behalf of the member, the process 1300 branches "On behalf" to an inviting operation 1314. In the inviting operation 1314, the private network administrator invites the nonmember to register with the private network. If the invitation policy specifies inviting directly from the member, the process 1300 branches "From member" to another inviting operation 1316, in which the member directly invites the nonmember to register.

Regardless of how the invitation is made to the nonmember, in a registering operation 1318, the nonmember is registered if the nonmember accepts the invitation. The registering operation 1318 involves deploying a message transfer node to the nonmember network, configuring the message transfer node, and registering the message transfer node with the processing hub. Registration can involve authenticating a certificate from the message transfer node.

Referring again to the query operation 1308, if the invitation policy specifies white-listing request, the process 1300 branches "White-list" to a requesting operation 1320. In the requesting operation 1320, a request is sent to the nonmember to white-list one or more members. If the nonmember accepts the request to white list one or more private network members, the nonmember may put the private network's public network MTA IP addresses on a white list that is used by the nonmembers' inbound filtering software. As a result, messages from white listed members will automatically avoid filtering. After the registering operation 1318 and/or the requesting operation 1320, the process 1300 ends at the returning operation 1310.

Figure 14:
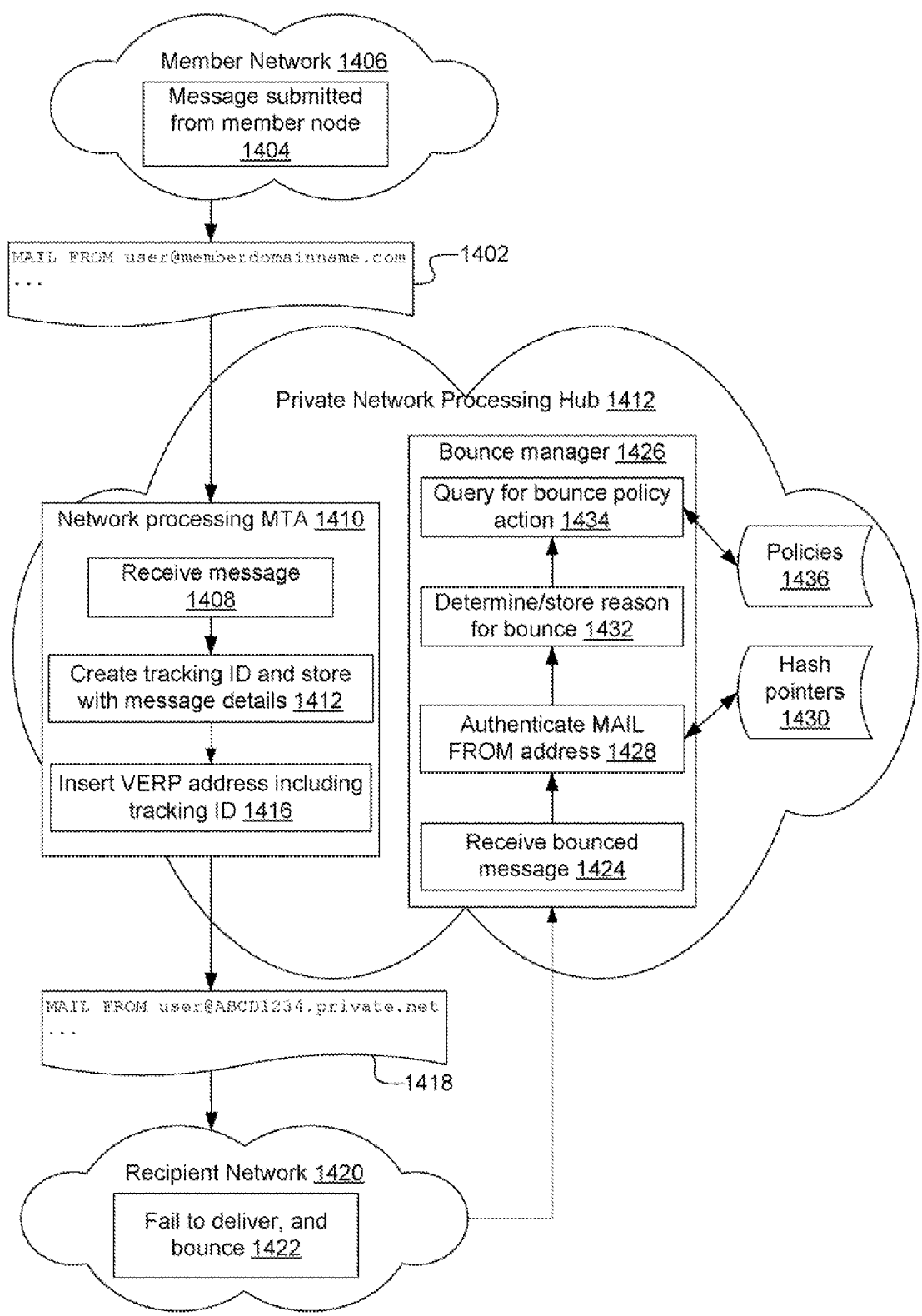
FIG. 14 is a message flow and processing diagram illustrating exemplary handling of messages that are routed through a private network processing hub and bounce back to the hub.

FIG. 14 is a message flow and processing diagram 1400 that illustrates one embodiment of a process for identifying and handling messages that are processed and sent by a private network processing hub, but that bounce back without reaching the intended recipient. In general, the private network processing hub inserts tracking identifiers into member messages before sending the messages to the intended recipients. The tracking identifiers indicate that the messages were sent and processed by the private network processing hub. When messages are received from an unregistered (nonmember) network, the private network processing hub can determine whether the messages are authorized bounced messages or unauthorized messages that are disguised as bounced messages.

To illustrate using FIG. 14, when a message 1402 is submitted (block 1404) by a member node of a member network 1406, the message 1402 is received (block 1408) by a network processing message transfer agent (MTA) 1410 in the private network processing hub 1412. The network processing MTA 1410 creates (block 1414) a tracking identifier based on one or more parts of the submitted message 1402. In one embodiment, the tracking identifier is a hash of the one or more message parts. The tracking ID may also include the sender's address and/or another network address (e.g., an address in the private network) in some encrypted form. In some embodiments, the hash is a primary hash value that is a combination of one or more secondary hash values. For example, the hash value may be a concatenation of hash values. The hash value can be used as a pointer to facilitate message tracking by storing the hash value with message details in a database.

A variable envelope return path (VERP) address is then created using the hash value. The VERP address includes a hash value that represents the tracking identifier as the local part of the email address and a domain name of the private network. A delivery MTA rewrites (block 1416) the MAIL FROM address of the submitted message 1404 to generate another message 1418 that is bounce verifiable, as is discussed further below. In various embodiments, the username or the domain name of the MAIL FROM address is modified. Whether the username is modified or the domain name is modified can be selectable. To illustrate, if the MAIL FROM field of the submitted message 1402 is "user@ memberdomainname.com", the MAIL FROM field of the new message 1404 can be modified to be user@ABCD1234.private.net or ABCD1234@private.net, assuming the hash value is ABCD1234, the original sender ID is "user", and the domain name of the private network processing hub is "private-net".

The verifiable message 1418 is then sent to the recipient network 1420. A recipient network MTA attempts to deliver the message 1418 to the intended recipient of the message. In the illustrated scenario, the recipient MTA is unable to deliver the message 1418 for any of various possible reasons. By way of example, but not limitation, the specified recipient may not be a valid user on the recipient network 1420, the message 1418 may have attachments that are rejected by the recipient network MTA, or the mailbox of the intended recipient may be full. The recipient MTA bounces (block 1422) the message 1418 back to the address identified in the MAIL FROM field in the message 1418.

Because the delivery MTA in the private network processing hub 1412 previously inserted the VERP address in to the message 1418, the message 1418 is bounced back to the private network processing hub 1412. A bounce message MTA receives (block 1424) the bounced message 1418. A bounced message manager 1426 reads the MAIL FROM address of the message 1418 and authenticates (block 1428) the MAIL FROM address by auditing (block 1430) a database of VERP address hash pointers. The database is searched for a hash pointer that matches the hash pointer portion of the MAIL FROM address.

In cases where the bounce manager 1426 does not find a matching hash pointer in the database, the message is rejected, because the bounce message was not in response to a message that originated from the private network processing hub 1412. Bounce messages that are not in response to messages from the private network are considered to be malicious messages from a public network, and are tracked and labeled as unauthorized messages. However, in the scenario shown in FIG. 14, it is assumed that the bounce manager 1426 does find the matching hash pointer, which was previously stored (block 1414) in the database by the network processing MTA 1410. The message 1418 is considered to be an authorized bounced message.

The bounce manager 1426 determines a reason for the bounce. In one embodiment, the reason for the bounce is determined by filtering (block 1432) the message 1418 to obtain information that indicates the reason for the bounce. In various embodiments, the bounce manager 1426 employs heuristics or Bayesian techniques to determine the reason for bounces. Examples of reasons for a bounce include, but are not limited to, recipient's mailbox is full, recipient address no longer exists, or content of the original message caused the recipient MTA to reject the message. The bounce manager 1426 stores the reason for the bounce in a bounce management report. The bounce manager 1426 may also flag the original message that caused the bounce, and link the original message to the bounce message in the database.

The bounce manager 1426 then determines an action or actions to take in response to receiving the bounced message 1418. In one embodiment, the action(s) is determined by querying (block 1434) a policy that specifies (block 1436) one or more actions to take in response to receiving a bounced message. The policy may be stored in a policy database and may be configured by an administrator of the member network 1406. Actions to take in response to receiving a bounced message can include sending the message to the original sender, sending the message to a specified message transfer agent of the member network 1406, deleting the message, or storing the message for later retrieval and analysis.

Exemplary-Computer-System Overview

Figure 15:
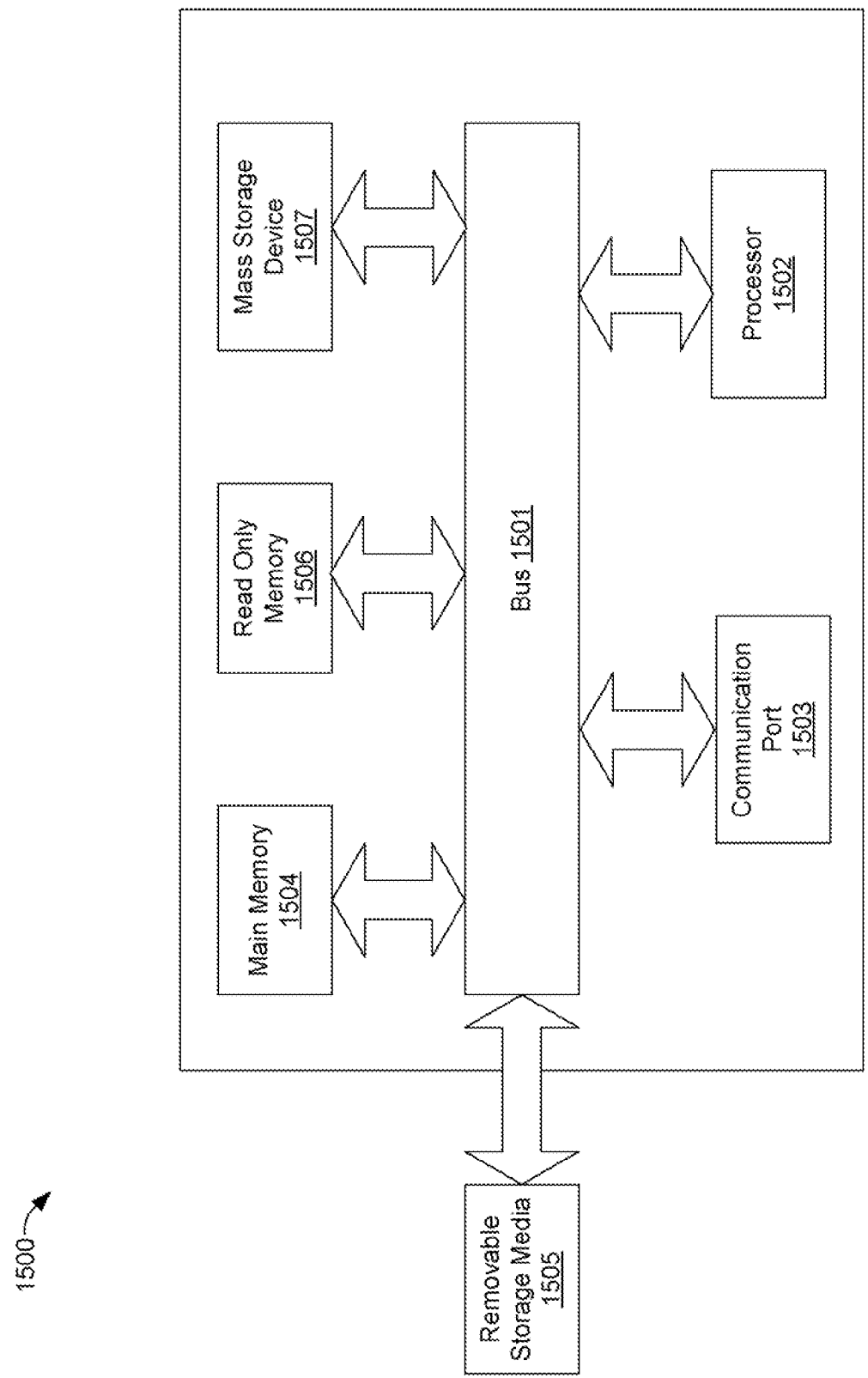
FIG. 15 illustrates an exemplary computing system that may be used to implement various portions of a trusted network in accordance with various embodiments.

Embodiments of the present invention include various steps, which are described above. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 15 illustrates an exemplary computer system 1500, such as a workstation, personal computer client, server or gateway, upon which or with which embodiments of the present invention may be utilized.

According to the present example, the computer system includes a bus 1501, at least one processor 1502, at least one communication port 1503, a main memory 1504, a removable storage media 1505 a read only memory 1506, and a mass storage 1507.

Processor(s) 1502 can be any known processor, such as, but not limited to, an Intel® Itanium® or Itanium 2 processor(s), or AMD® Opteron® or Athlon MP® processor(s), or Motorola® lines of processors. Communication port(s) 1503 can be any of an RS232 port for use with a modem based dialup connection, a 10/100 Ethernet port, or a Gigabit port using copper or fiber. Communication port(s) 1503 may be chosen depending on a network such a Local Area Network (LAN), Wide Area Network (WAN), or any network to which the computer system 1500 connects.

Main memory 1504 can be Random Access Memory (RAM), or any other dynamic storage device(s) commonly known in the art, Read only memory 1506 can be any static storage device(s) such as Programmable Read Only Memory (PROM) chips for storing static information such as instructions for processor 1502.

Mass storage 1507 can be used to store information and instructions. For example, hard disks such as the Adaptec® family of SCSI drives, an optical disc, an array of disks such as RAID, such as the Adaptec family of RAID drives, or any other mass storage devices may be used.

Bus 1501 communicatively couples processor(s) 1502 with the other memory, storage and communication blocks. Bus 1501 can be a PCI/PCI-X or SCSI based system bus depending on the storage devices used.

Removable storage media 1505 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives.

The components described above are meant to exemplify some types of possibilities. In no way should the aforementioned examples limit the scope of the invention, as they are only exemplary embodiments.

In conclusion, embodiments of the present invention provide novel systems and methods for providing a trusted communication network by routing outbound message traffic through a private network configured to filter outbound messages, detect threats, maintain a reputation metric, provide reputation management services, manage bounced messages and perform relationship discovery. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A private network processing hub that receives and processes messages submitted by a plurality of independent member networks and handles bounced messages intended for said plurality of independent member networks, said private network processing hub and said independent member networks combining to form a private network, said private network processing hub comprising:

a message transfer agent that receives an original message from a member network of said plurality of independent member networks, said original message being sent from an original sender to a recipient, said message transfer agent further creating a tracking identifier indicating that said original message was routed through said private network processing hub, and inserting said tracking identifier into said original message prior to sending said original message to said recipient; and a bounce management module that receives a second message and determines that said second message is a bounced message, said bounce management module further determining that said bounced message was generated in response to said original message by examining said bounced message to ascertain if said bounced message includes said tracking identifier, if said bounced message includes said tracking identifier then said bounced message is an authenticated bounced message and is delivered to said member network, if said bounced message does not include said tracking identifier then said bounced message is considered a malicious message and is rejected by said private network processing hub and is not delivered to said member network, wherein the tracking identifier is inserted into the original message by rewriting a MAIL FROM field in the original message, wherein the MAIL FROM field is rewritten by replacing a domain name in the MAIL FROM field with a Variable Envelope Return Path (VERP) address that includes the tracking identifier, and wherein the VERP address is used to filter incoming messages, wherein the bounce management module is further configured to determine an action to take responsive to receiving the authenticated bounced message, wherein the action is specified in a policy associated with the member network of the original sender.

2. The private network processing hub as recited in claim 1, wherein said tracking identifier comprises a hash pointer based on one or more parts of said original message.

3. The private network processing hub as recited in claim 1, wherein said bounce management module verifies that said second message is an authenticated bounced message generated in response to said original message by auditing a database of tracking identifiers.

4. The private network processing hub as recited in claim 1, wherein said action to be taken is selected from a group consisting of:

send said bounced message back to said original sender;
submit said bounced message to one or more specified administrative addresses in said member network;
delete said bounced message; and
store said bounced message for later retrieval.

5. The private network processing hub as recited in claim 1, wherein said bounce management module further filters said authenticated bounced message to obtain data indicative of a reason for bouncing.

6. The private network processing hub as recited in claim 5, wherein said bounce management module further generates a report indicating said reason for said bounced message.

7. The private network processing hub as recited in claim 6, wherein said bounce management module further aggregates a plurality of reports related to all bounced messages received in a specified period.

8. A method for handling bounced messages using a private network processing hub, said private network processing hub receiving and processing messages submitted by a plurality of member network that are registered with said private network processing hub, said private network processing hub and said plurality of member networks combining to form a private network, said method comprising:
receiving an original message from a member network of said plurality of member networks at said private network processing hub, said original message being sent from an original sender to a recipient;
generating a tracking identifier by said private network processing hub that indicates that said original message was routed through said private network processing hub;
inserting said tracking identifier into said original message by said private network processing hub prior to sending said original message to said recipient;
receiving a second message at said private network processing hub from one of said member networks of said plurality of member networks or from an unregistered network;
determining by said private network processing hub that said second message is a bounced message;
examining said bounced message by said private network processing hub to ascertain if said bounced message includes said tracking identifier;
determining by said private network processing hub whether said bounced message is an authenticated bounced message or a malicious message such that said bounced message is an authenticated bounced message that was generated in response to said original message if said bounced message includes said tracking identifier and said bounced message is considered a malicious message if said bounced message does not include said tracking identifier then said bounced message;
delivering from said private network processing hub to said member network said authenticated bounced message if said bounced message is determined to be said authenticated bounced message;
rejecting said malicious message by said private network processing hub and not delivering said malicious message from said private network hub to said member network if said bounced message is determined to be said malicious message, wherein the tracking identifier is inserted into the original message by rewriting a MAIL FROM field in the original message, wherein the MAIL FROM field is rewritten by replacing a domain name in the MAIL FROM field with a Variable Envelope Return Path (VERP) address that includes the tracking identifier, and wherein the VERP address is used to filter incoming messages; and
determining an action to take responsive to the authenticated bounced message, wherein the action is specified in a policy associated with the member network of the original sender.

9. The method as recited in claim 8, wherein determining by said private network processing hub whether said bounced message is an authenticated bounced message or a malicious message further comprises searching by said private network processing hub for said tracking identifier in a memory containing a plurality of tracking identifiers.

10. The method as recited in claim 7, further comprising said private network processing hub utilizing content of said bounced message to determine a reputation metric related to a source of said bounced message.

11. The method as recited in claim 10, wherein said reputation metric is a measure of said source's reputation for generating spam.

12. The method as recited in claim 11, further comprising said private network processing hub using content of said bounced message to derive a spam signature.

13. The method as recited in claim 8, further comprising determining by said private network processing hub a disposition for said bounced message if said tracking identifier is found.

14. The method as recited in claim 8, wherein said action is selected from a group consisting of:
send said bounced message to said original sender;
send said bounced message to a specified administrator address in said member network;
delete said bounced message; and
store said bounced message for later analysis.

15. The method as recited in claim 13 further comprising said private network processing hub filtering said bounced message to obtain information indicative of a reason that said bounced message was generated.

16. The method as recited in claim 13, further comprising said private network processing hub filtering said bounced message to obtain information indicative of a reason that said bounced message was generated.

17. A non-transitory machine-readable storage medium that stores instructions for a private network processing hub to perform processes to handle bounced messages, said private network processing hub receiving and processing messages submitted by a plurality of member networks that are registered with said private network processing hub, said private network processing hub and said plurality of member networks combining to form a private network, said processes comprising:
receiving an original message from a member network of said plurality of member networks at said private network processing hub, said original message being sent from an original sender to a recipient;
generating a tracking identifier that indicates that said original message was routed through said private network processing hub;
inserting said tracking identifier into said original message prior to sending said original message to said recipient;
receiving a second message at said private network processing hub from one of said member networks of said plurality of member networks or from an unregistered network;
determining that said second message is a bounced message;
examining said bounced message to ascertain if said bounced message includes said tracking identifier;
determining whether said bounced message is an authenticated bounced message or a malicious message such that said bounced message is an authenticated bounced message that was generated in response to said original message if said bounced message includes said tracking identifier and said bounced message is considered a malicious message if said bounced message does not include said tracking identifier then said bounced message;

delivering from said private network processing hub to said member network said authenticated bounced message if said bounced message is determined to be said authenticated bounced message;

rejecting said malicious message and not delivering said malicious message from said private network hub to said member network if said bounced message is determined to be said malicious message, wherein the tracking identifier is inserted into the original message by rewriting a MAIL FROM field in the original message, wherein the MAIL FROM field is rewritten by replacing a domain name in the MAIL FROM field with a Variable Envelope Return Path (VERP) address that includes the tracking identifier, and wherein the VERP address is used to filter incoming messages; and determining an action to take responsive to the authenticated bounced message, wherein the action is specified in a policy associated with the member network of the original sender.

18. The non-transitory machine-readable storage medium as recited in claim 17, wherein said process of determining whether said bounced message is an authenticated bounced message or a malicious message further comprises searching for said tracking identifier in a memory containing a plurality of tracking identifiers.

\* \* \* \* \*

UNITED STATES PATENT AND TRADEMARK OFFICE
CERTIFICATE OF CORRECTION

PATENT NO. : 8,738,708 B2
APPLICATION NO. : 11/537432
DATED : May 27, 2014
INVENTOR(S) : Chasin It is certified that error appears in the above-identified patent and that said Letters Patent is hereby corrected as shown below:

On title page 3, item [56] under "OTHER PUBLICATIONS", column 1, line 21, Delete "Propogating" and insert -- Propagating --, therefor.

On title page 3, item [56] under "OTHER PUBLICATIONS", column 1, line 21, Delete "Anamoly" and insert -- Anomaly --, therefor.

On title page 3, item [56] under "OTHER PUBLICATIONS", column 2, line 53, Delete ""Servey" and insert -- "Survey --, therefor.

In the Specification

Column 1, line 31, Delete "disclosure" and insert -- disclosures --, therefor.

In the Claims

Column 28, line 7, Claim 10, delete "claim 7," and insert -- claim 8, --, therefor.

Column 28, line 33-35, Claim 16, delete "filtering said bounced message to obtain information indicative of a reason that said bounced message was generated." and insert -- generating a report that provides said reason for said bounced message. --, therefor.

Signed and Sealed this
Twentieth Day of January, 2015

Michelle K. Lee
*Deputy Director of the United States Patent and Trademark Office*